US012760130B2

(12) United States Patent
Saito

(10) Patent No.: US 12,760,130 B2
(45) Date of Patent: Oct. 13, 2026

(54) SOLID CATALYST COMPONENT FOR OLEFIN POLYMERIZATION, METHOD FOR PRODUCING SOLID CATALYST COMPONENT FOR OLEFIN POLYMERIZATION, CATALYST FOR OLEFIN POLYMERIZATION, METHOD FOR PRODUCING OLEFIN POLYMER PARTICLE AND OLEFIN POLYMER PARTICLE

(71) Applicant: TOHO TITANIUM CO., LTD., Chigasaki (JP)

(72) Inventor: Masayoshi Saito, Chigasaki (JP)

(73) Assignee: TOHO TITANIUM CO., LTD., Chigasaki (JP)

( * ) Notice: Subject to any disclaimer, the term of this patent is extended or adjusted under 35 U.S.C. 154(b) by 677 days.

(21) Appl. No.: 18/034,015

(22) PCT Filed: Oct. 19, 2021

(86) PCT No.: PCT/JP2021/038597

§ 371 (c)(1),
(2) Date: Apr. 26, 2023

(87) PCT Pub. No.: WO2022/091867

PCT Pub. Date: May 5, 2022

(65) Prior Publication Data

US 2023/0383024 A1 Nov. 30, 2023

(30) Foreign Application Priority Data

Oct. 28, 2020 (JP) ................................ 2020-180104

(51) Int. Cl.

| | |
|---|---|
| ***C08F 4/64*** | (2006.01) |
| ***B01J 31/38*** | (2006.01) |
| ***C01G 23/00*** | (2006.01) |
| ***C08F 4/654*** | (2006.01) |
| ***C08F 10/06*** | (2006.01) |

(52) U.S. Cl.
CPC ............ *C08F 10/06* (2013.01); *C01G 23/006* (2013.01); *C08F 4/6548* (2013.01); *B01J 31/38* (2013.01);

(Continued)

(58) Field of Classification Search
CPC ........ C08F 4/6548; C08F 4/64; C08F 110/06; C08F 210/16
See application file for complete search history.

(56) References Cited

U.S. PATENT DOCUMENTS 5,965,478 A 10/1999 Goto et al.
6,784,133 B2 * 8/2004 Kim ........................ C08F 10/00
526/124.8

(Continued)

FOREIGN PATENT DOCUMENTS

JP 1-315406 A 12/1989
JP 2002-356507 A 12/2002

(Continued)

OTHER PUBLICATIONS

Extended (Supplementary) European Search Report dated Sep. 25, 2024, issued in counterpart EP Application No. 21885986.6. (10 pages).

(Continued)

*Primary Examiner* — Rip A Lee
(74) *Attorney, Agent, or Firm* — WHDA, LLP

(57) ABSTRACT

Provided is a solid catalyst component for olefin polymerization capable of suitably producing polymer particles with a suppressed content ratio of fine powder and reduced surface stickiness at high activity when subjected to polymerization of an olefin. The solid catalyst component for olefin polymerization contains magnesium, titanium, halogen and an internal electron-donating compound, in which a cross-sectional pore area ratio is 10 to 50%, and a ratio (Continued)

$MX_i/MX_s$ of a cross-sectional pore area ratio ($MX_i$) in a region of less than 50% in a radial direction to a cross-sectional pore area ratio ($MX_s$) in a region of 50% or more in the radial direction from a particle center is 0.50 to 2.00.

6 Claims, 7 Drawing Sheets

(52) U.S. Cl.
CPC ....... *C01P 2004/61* (2013.01); *C01P 2006/11* (2013.01); *C08F 4/64* (2013.01)

(56) References Cited

U.S. PATENT DOCUMENTS

| | | | | |
|---|---|---|---|---|
| 9,670,294 | B2 * | 6/2017 | Hosaka ................. | C08F 110/06 |
| 2003/0153454 | A1 | 8/2003 | Hosoka et al. | |
| 2004/0063572 | A1 | 4/2004 | Kim et al. | |
| 2019/0233569 | A1 | 8/2019 | Umebayashi | |
| 2020/0283553 | A1 | 9/2020 | Marin et al. | |
| 2020/0299422 | A1 | 9/2020 | Kono et al. | |

FOREIGN PATENT DOCUMENTS

| | | | |
|---|---|---|---|
| JP | 2005-504132 | A | 2/2005 |
| JP | 2013-95890 | A | 5/2013 |
| JP | 2018-048951 | A | 3/2018 |
| WO | 2018/066535 | A1 | 4/2018 |

OTHER PUBLICATIONS

International Search Report dated Jan. 11, 2022, issued in counterpart International Application No. PCT/JP2021/038597, with English Translation. (5 pages).

* cited by examiner

[FIG.1]
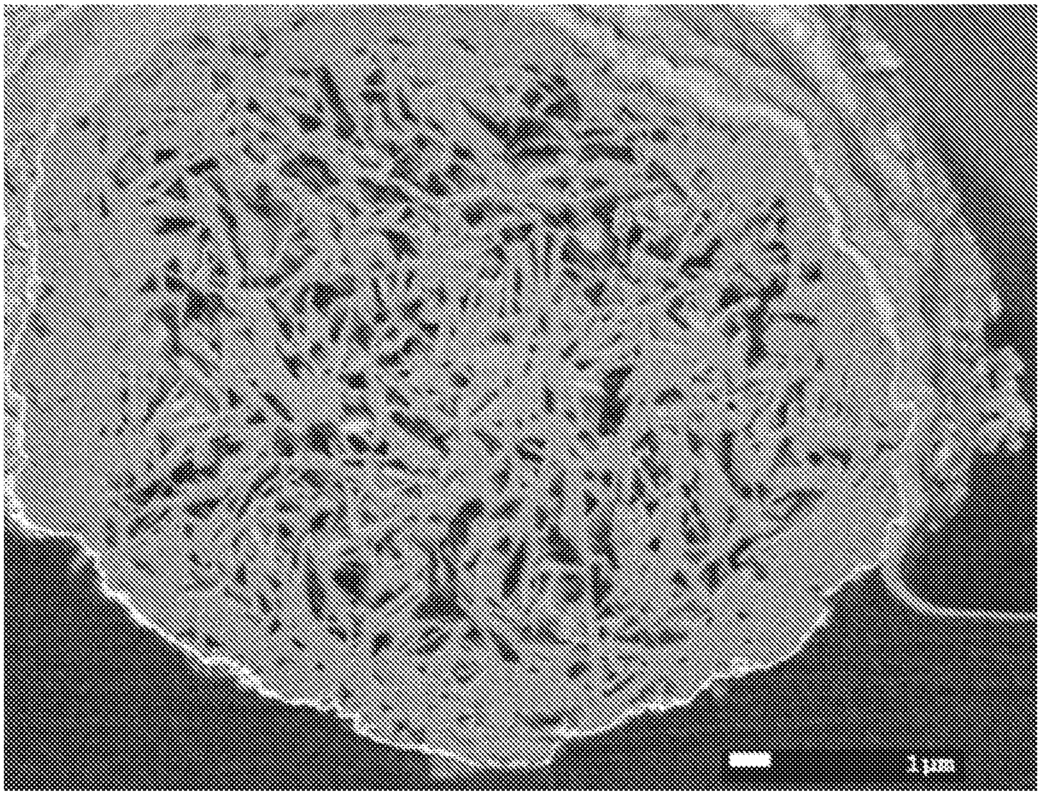
[FIG.2]
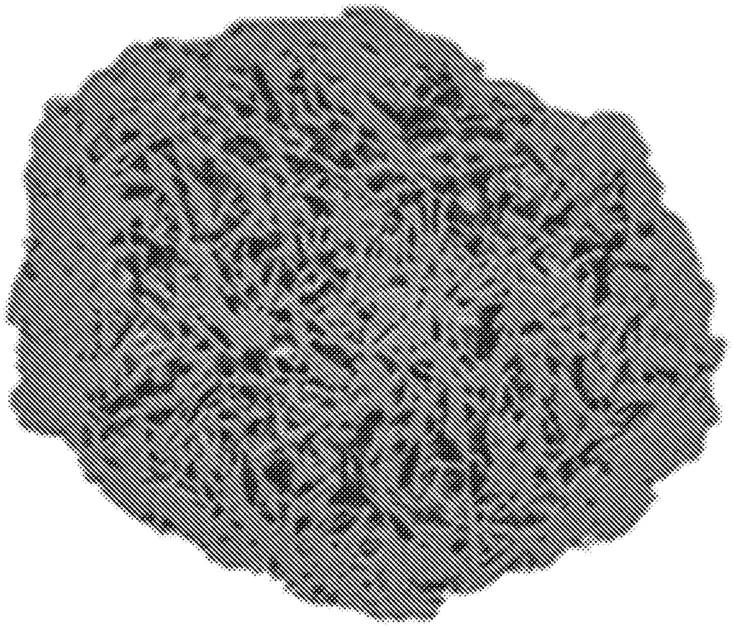

[FIG.3]
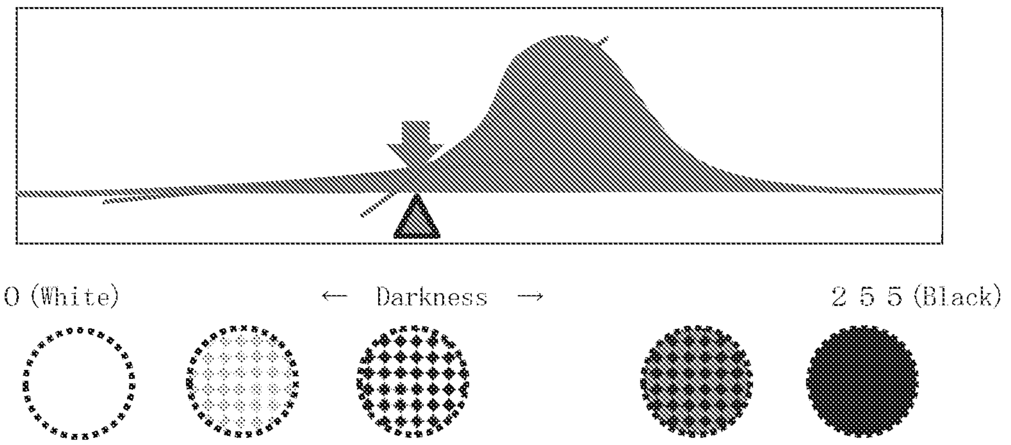
[FIG.4]
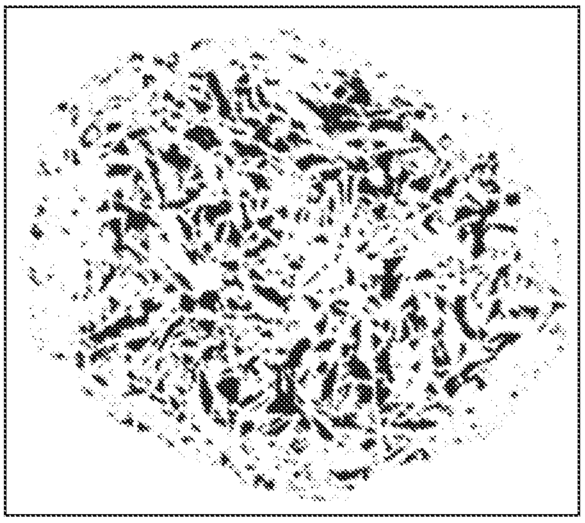

[FIG.5]
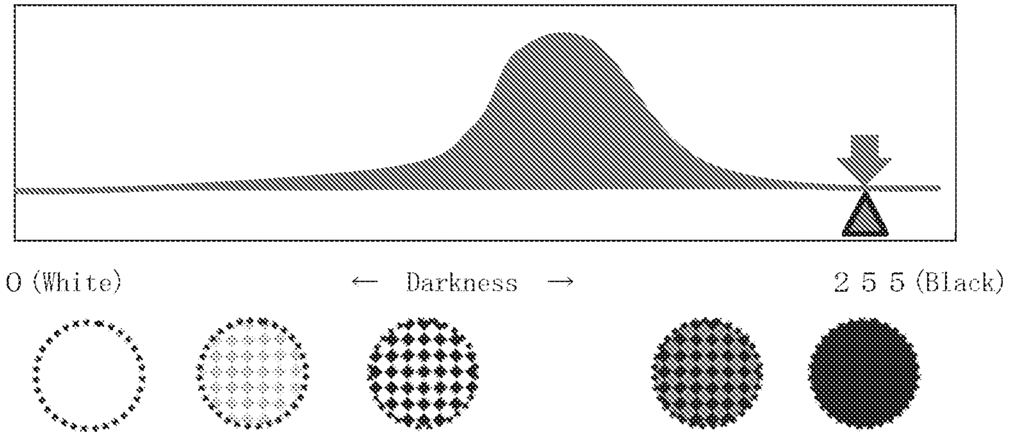
[FIG.6]
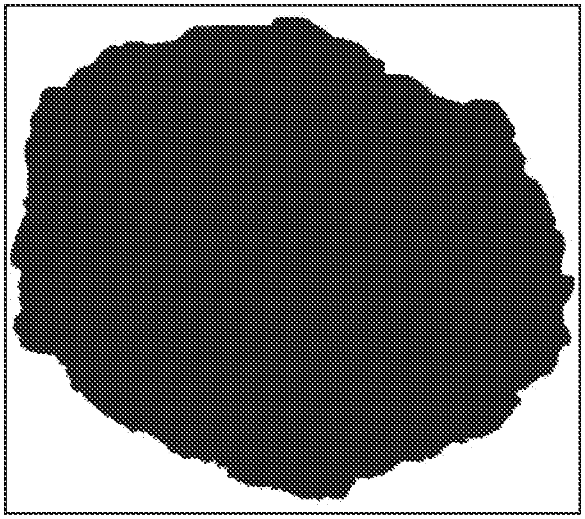

[FIG.7]
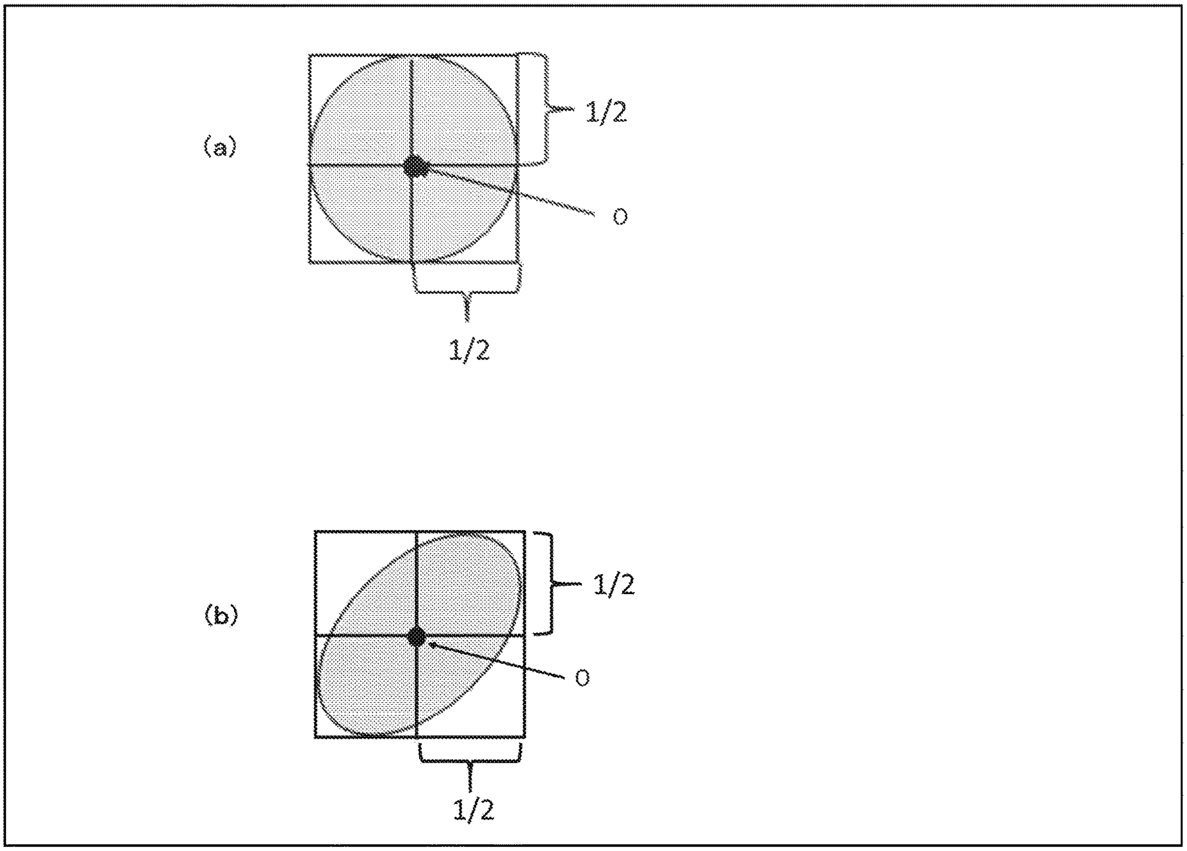

[FIG.8]
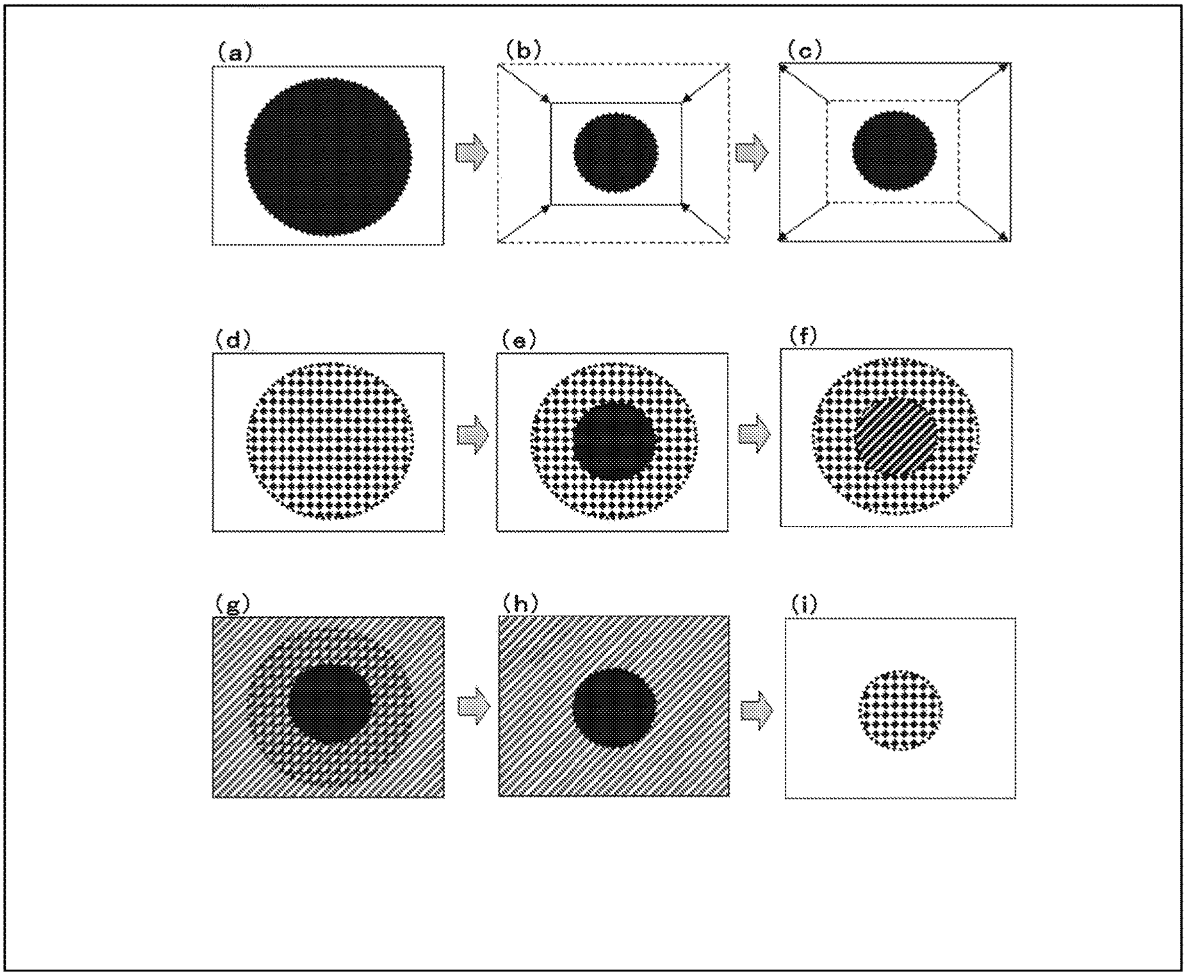

[FIG.9]
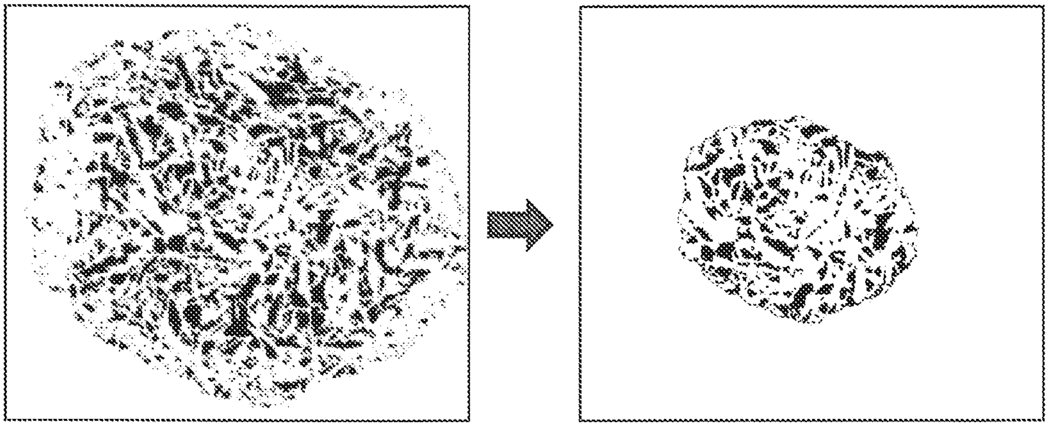
[FIG.10]
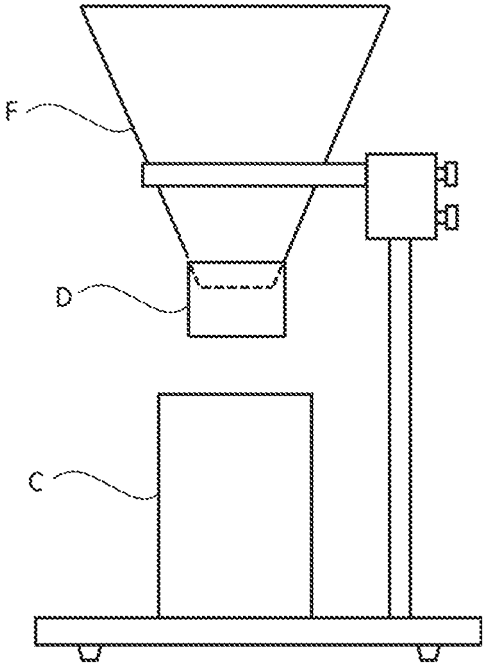

[FIG.11]
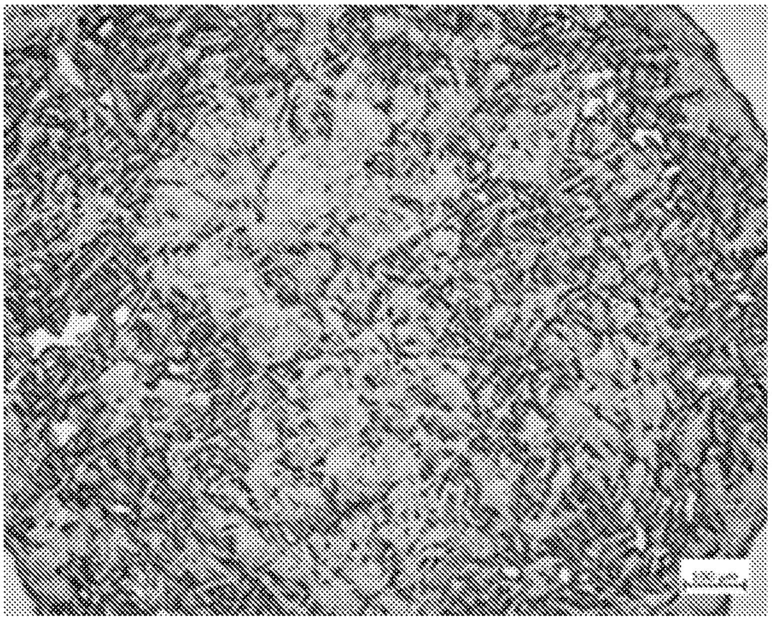

SOLID CATALYST COMPONENT FOR OLEFIN POLYMERIZATION, METHOD FOR PRODUCING SOLID CATALYST COMPONENT FOR OLEFIN POLYMERIZATION, CATALYST FOR OLEFIN POLYMERIZATION, METHOD FOR PRODUCING OLEFIN POLYMER PARTICLE AND OLEFIN POLYMER PARTICLE

TECHNICAL FIELD

The present invention relates to a solid catalyst component for olefin polymerization, a method for producing a solid catalyst component for olefin polymerization, a catalyst for olefin polymerization, a method for producing an olefin polymer particle, and an olefin polymer particle.

BACKGROUND ART

Conventionally, known olefin polymerization methods include propylene homopolymerization and copolymerization of ethylene and propylene using a solid catalyst component for olefin polymerization containing magnesium, titanium, halogen and an internal electron-donating compound (hereinafter, also referred to as a solid catalyst component as appropriate). In such polymerization methods, an olefin is polymerized in the presence of a catalyst for olefin polymerization containing an organoaluminum compound, a silicon compound and the like together with the solid catalyst component for olefin polymerization (see, for example, Patent Literature 1).

Since the polymerization of the olefin is carried out continuously in the industry, it is important to carry out a stable operation. On the other hand, in the case of carrying out a continuous polymerization operation, polymer particles generated adhere to a polymerization vessel, piping or the like, resulting in an easy occurrence of piping blockage or the like. It is considered that such piping blockage or the like occurs due to the adhesion of fine powdery polymer particles (hereinafter, also referred to as polymers as appropriate) having a large specific surface area and a high charge rate or due to adhesiveness of the polymer particles themselves (stickiness of the particles).

For example, as described in Patent Literature 1, when an olefin is polymerized using a catalyst for polymerization containing a highly active solid catalyst component and an external electron donor represented by an organoaluminum compound and a silicon compound, fine powder of the solid catalyst component itself and the destruction of polymer particles due to reaction heat during polymerization result in a large amount of the fine powder contained in the generated polymer with a tendency for the particle size distribution to be broadened.

Since the broadening of the particle size distribution consequently has an unfavorable effect on the forming process of the polymer, there is a growing demand for a polymer having a small amount of fine powdery polymer particles, a narrow particle size distribution and a uniform particle size.

In addition, copolymer particles obtained by polymerizing the olefin are not only inferior in handling and workability because the surface thereof is liable to be sticky but also have reduced flowability due to the stickiness, which hinders simple and quick transfer. As a result, significant production loss is apt to occur with piping blockage.

CITATION LIST

Patent Literature

[Patent Literature 1] Japanese Patent Laid-Open No. 1-315406

SUMMARY OF INVENTION

Technical Problem

Under such circumstances, an object of the present invention is to provide a solid catalyst component for olefin polymerization capable of producing polymer particles with a suppressed content ratio of fine powder and suppressed surface stickiness at high activity when subjected to polymerization of an olefin and also to provide a method for producing a solid catalyst component for olefin polymerization, a catalyst for olefin polymerization, a method for producing an olefin polymer particle and an olefin polymer particle.

Solution to Problem

A polymer obtained by polymerizing a monomer such as propylene has a close relationship with a solid catalyst component for olefin polymerization constituting a catalyst for polymerization of such a monomer (hereinafter, also referred to as a catalyst or a catalyst particle as appropriate). Conventionally, a method for synthesizing a solid catalyst component has been studied on a temperature during synthesis and a halogenated substance to be used.

It is considered that fine powdery polymer particles are generated due to the fine powdery catalyst particles originally contained in the catalyst (or fine powdery solid catalyst component for olefin polymerization constituting the fine powdery catalyst particles) or due to the catalyst particles which have been broken into fine powder during polymerization.

Therefore, the present inventor has first conceived the idea of providing catalyst particles with (1) a reduced content ratio of fine powdery catalyst particles originally mixed at a certain ratio and (2) a structure having high strength that is not broken during polymerization.

In addition, it is considered that stickiness on the surface of polymer particles is caused by, for example, residual olefins and organic solvents used during polymerization in the pores and in the vicinity of the pores on the surface of polymer particles in the case of homopolymerization, and by the generated rubber component oozing out to the surface of polymer particles in the case of copolymerization.

Since it is considered that the pores formed on the surface of the polymer particles such as the homopolymer and copolymer are formed due to the surface shape of the catalyst particles, the present inventor has conceived the idea of providing catalyst particles with (3) a structure in which surface adhesion and exudation of olefins and rubber components are unlikely to occur.

In order to provide catalyst particles having the characteristics (1) to (3) above, the present inventor has focused on an internal structure of the solid catalyst component for olefin polymerization constituting such catalyst particles, particularly on the relationship with the cross-sectional pore area ratio inside the solid catalyst component for olefin polymerization. In other words, the present inventor has focused on the fact that a solid catalyst component for olefin polymerization with high strength is employed in which the cross-sectional pore area ratio of the inside (pore area ratio in the cross section of the solid catalyst component particle) and the pore distribution are controlled in a predetermined range, thereby reducing the amount of fine powder contained in the solid catalyst component for olefin polymerization, reducing the amount of fine powder contained in the catalyst, preventing generation of fine powder without being broken during polymerization and making it possible to generate polymer particles with suppressed surface stickiness in which surface adhesion and exudation of olefins and rubber components are unlikely to occur.

In order to embody the above idea, on the other hand, a method for preparing a solid catalyst component for olefin polymerization in which the above cross-sectional pore area ratio is controlled as well as a method for measuring the internal structure of the resulting solid catalyst component for olefin polymerization have been required.

Specifically, since the solid catalyst component for olefin polymerization containing magnesium as a main component is anaerobic and water-prohibiting, when a particle of the solid catalyst component serving as a measurement sample is cut in order to analyze internal information, various damages are easily applied to the cut surface. Thus, it has been extremely difficult to accurately examine the internal structure of the solid catalyst component for olefin polymerization.

Conventionally, specific surface area measurement and pore distribution measurement by gas adsorption method are known as techniques to obtain the internal information of the solid catalyst component for olefin polymerization. In this method, gas molecules having a known adsorption occupied area per unit amount are adsorbed in advance on the surface of a particle to be measured, and the specific surface area of the particle to be measured can be measured from the adsorption amount, or the pore distribution can be determined from condensation of the gas molecules.

However, in the above method, information on the entire particle, such as the amount of pores inside the particle, can be obtained, but more detailed information such as the pore distribution in the particle is unknown.

In addition, a mercury intrusion method (mercury porosimeter) is known in which mercury is intruded under high pressure into pores in a particle to be measured by utilizing the large surface tension of mercury to determine the specific surface area and pore distribution from the pressure applied during pressurization and the amount of mercury intruded. Even with this method, information on the entire particle, such as the amount of pores inside the particle, can be obtained, but more detailed information such as the pore distribution in the particle is unknown.

As a cutting device for solid particles, an ion slicer using an argon ion beam, a cross section polisher (CP) or the like is also known. When the solid particles are cut using the above device, however, it is necessary to embed the sample with a resin agent or the like in order to eliminate, for example, unevenness on the surface of the sample. As a result of studies, the present inventor has found that particles composed of solid catalyst components for olefin polymerization react with the resin agent to be altered.

Moreover, it has been found that when there is a concave portion in a sample and cutting is performed without embedding, heat accumulates in the concave portion while the sample is susceptible to damage such as deformation due to heat, thus making it difficult to perform precise cross-sectional observation.

Under such circumstances, the present inventors have found that the internal structure of a solid catalyst component for olefin polymerization, which contains aerobic and water-prohibiting particles, can be measured by cutting the solid catalyst component under a temperature condition of −70° C. or less in an inert atmosphere using a cooling cross-section machining device (cooling-type cross section polisher (CCP)) with no exposure to air, and thus the present invention has been completed.

In other words, the present inventors have found that the technical problems can be solved by a solid catalyst component for olefin polymerization containing magnesium, titanium, halogen and an internal electron-donating compound, in which a cross-sectional pore area ratio (pore area ratio in the cross section of a solid catalyst component particle) is 10 to 50% on a cut surface when cutting is performed under a temperature condition of −70° C. or less using a cooling cross-section machining device with no exposure to air in a state where a thermally conductive coating is provided on the surface, and a ratio $MX_i/MX_s$ of a cross-sectional pore area ratio ($MX_i$) in a region of less than 50% in a radial direction to a cross-sectional pore area ratio (MX) in a region of 50% or more in the radial direction from a particle center is 0.50 to 2.00. On the basis of this finding, the present invention has been completed.

Specifically, the present invention provides:

(1) a solid catalyst component for olefin polymerization, containing magnesium, titanium, halogen and an internal electron-donating compound, in which a cross-sectional pore area ratio is 10 to 50%, and a ratio $MX_i/MX_s$ of a cross-sectional pore area ratio ($MX_i$) in a region of less than 50% in a radial direction to a cross-sectional pore area ratio ($MX_s$) in a region of 50% or more in the radial direction from a particle center is 0.50 to 2.00;

(2) a method for producing a solid catalyst component for olefin polymerization, including contacting a magnesium compound, a tetravalent titanium halogen compound and an internal electron-donating compound with each other, followed by pressurization to prepare a precursor, and further contacting the precursor, a tetravalent titanium halogen compound and an internal electron-donating compound with each other prepared by;

(3) a catalyst for olefin polymerization, containing:

(A) the solid catalyst component for olefin polymerization according to (1) above, and (B) an organoaluminum compound;

(4) The catalyst for olefin polymerization according to (3) above, further containing (C) an external electron-donating compound;

(5) a method for producing an olefin polymer particle, including polymerizing an olefin using the catalyst for olefin polymerization according to (3) or (4) above; and (6) An olefin polymer particle, in which a cross-sectional pore area ratio is 10 to 50%, and a ratio $M'X_i/M'X_s$ of a cross-sectional pore area ratio ($M'X_i$) in a region of less than 50% in a radial direction to a cross-sectional pore area ratio ($M'X_s$) in a region of 50% or more in the radial direction from a particle center is 0.50 to 2.00.

Advantageous Effects of Invention

The present invention provides a solid catalyst component for olefin polymerization capable of suitably producing polymer particles with a suppressed content ratio of fine powder and reduced surface stickiness at high activity when subjected to polymerization of an olefin, and can also provide a method for producing a solid catalyst component for olefin polymerization, a catalyst for olefin polymerization, a method for producing an olefin polymer particle and an olefin polymer particle.

BRIEF DESCRIPTION OF DRAWINGS

FIG. 1 shows an example of a scanning electron microscope (SEM) photograph of a cut surface (particle cross-section processing site) of a measurement particle processed with a cooling cross-section device with no exposure to air.

FIG. 2 is an example of an SEM image of only a cross-sectional portion of a particle.

FIG. 3 illustrates a method for calculating the area of a particle cross section (the number of pixels constituting the entire particle cross section).

FIG. 4 is a cross-sectional image of a particle with two gradations.

FIG. 5 illustrates a method of obtaining an image in which the entire cross-sectional portion of a particle is displayed in black.

FIG. 6 is a cross-sectional image in which the entire cross-sectional portion of a particle is displayed in black.

FIG. 7 illustrates a method of specifying the center of a particle.

FIG. 8 illustrates a method for calculating a cross-sectional pore area ratio in an inner particle region of less than 50% in the radial direction.

FIG. 9 shows an entire cross-sectional image of a particle with two gradations (left image) and an image of the inner particle region (at the center of the cross section) of less than 50% in the radial direction of the particle cross section with two gradations.

FIG. 10 is a schematic view illustrating a method for evaluating the flowability of a polymer.

FIG. 11 is a photomicrograph of a dispersion state of EPR in the cross section of a copolymer particle obtained in a comparative example of the present invention.

DESCRIPTION OF EMBODIMENTS

First, the solid catalyst component for olefin polymerization according to the present invention will be described.

The solid catalyst component for olefin polymerization according to the present invention contains magnesium, titanium, halogen and an internal electron-donating compound, in which a cross-sectional pore area ratio is 10 to 50%, and a ratio $MX_i/MX_s$ of a cross-sectional pore area ratio ($MX_i$) in a region of less than 50% in the radial direction to a cross-sectional pore area ratio ($MX_s$) in a region of 50% or more in the radial direction is 0.50 to 2.00.

The solid catalyst component for olefin polymerization of the present invention contains magnesium, titanium, halogen and an internal electron-donating compound.

Examples of the solid catalyst component for olefin polymerization containing magnesium, titanium, halogen and an internal electron-donating compound include a solid catalyst component obtained by contacting a magnesium compound, a tetravalent titanium halogen compound and an internal electron-donating compound with each other, followed by pressurization to prepare a precursor, and further contacting the precursor, a tetravalent titanium halogen compound and an internal electron-donating compound with each other.

Examples of the magnesium compound include one or more compounds selected from dialkoxy magnesium, magnesium dihalide and alkoxy magnesium halide.

Among these magnesium compounds, dialkoxy magnesium or magnesium dihalide is preferred. Specific examples thereof include dimethoxy magnesium, diethoxy magnesium, dipropoxy magnesium, dibutoxy magnesium, ethoxymethoxy magnesium, ethoxypropoxy magnesium, butoxyethoxy magnesium, magnesium dichloride, magnesium dibromide, and magnesium diiodide. Diethoxy magnesium and magnesium dichloride are particularly preferred.

The dialkoxy magnesium may be obtained by reacting metal magnesium with an alcohol in the presence of halogen, a halogen-containing metal compound or the like.

The dialkoxy magnesium is preferably in the form of granules or powder, and the shape used may be indefinite or spherical.

In the case of using spherical dialkoxy magnesium, a polymer powder having a more favorable particle shape and having a (more spherical) narrow particle size distribution is obtained. The handleability of the polymer powder formed at the time of polymerization operation is improved, and occlusion, etc. attributed to a fine powder contained in the formed polymer powder can be prevented.

The spherical dialkoxy magnesium is not necessarily required to be truly spherical in shape, and dialkoxy magnesium having an oval shape or a potato shape may be used.

The average particle size of the dialkoxy magnesium is preferably 1 to 500 μm, more preferably 10 to 250 μm and even more preferably 10 to 100 μm in terms of average particle size $D_{50}$ (50% particle size in terms of an integral particle size in a volume-integrated particle size distribution) when measured using a laser light scattering/diffraction particle size analyzer.

The average particle size $D_{50}$ of the spherical dialkoxy magnesium is preferably 1 to 100 μm, more preferably 5 to 80 μm and even more preferably 10 to 60 μm.

For the particle size of the dialkoxy magnesium, it is preferred that the dialkoxy magnesium should have a narrow particle size distribution with fewer numbers of a fine powder and a coarse powder.

Specifically, when measured using a laser light scattering/diffraction particle size analyzer, the dialkoxy magnesium preferably contains particles with a diameter of 10 μm or less in an amount of 20% or less, more preferably 15% or less, and even more preferably 10% by mass or less. On the other hand, when measured using a laser light scattering/diffraction particle size analyzer, the dialkoxy magnesium preferably contains particles with a diameter of 100 μm or more in an amount of 10% or less, more preferably 5% or less and even more preferably 3% by mass or less.

Further, the particle size distribution SPAN calculated by the following formula $(D_{90}-D_{10})/D_{50}$ is preferably 3.0 or less, more preferably 2.5 or less, and even more preferably 2.0 or less. Herein, $D_{90}$ is 90% particle size in terms of an integral particle size in a volume-integrated particle size distribution when measured using a laser light scattering/diffraction particle size analyzer, and $D_{10}$ is 10% particle size in terms of an integral particle size in a volume-integrated particle size distribution when measured using a laser light scattering/diffraction particle size analyzer.

By using the dialkoxy magnesium in which the amount of fine powder or the like is controlled as described above or the particle size distribution (SPAN) is controlled within the above range, it is possible to easily provide a solid catalyst component for olefin polymerization capable of producing polymer particles with a reduced content ratio of fine powder at high activity.

Furthermore, the bulk specific gravity of the dialkoxy magnesium is preferably 0.20 to 0.40 g/ml, more preferably 0.23 to 0.37 g/ml and even more preferably 0.25 to 0.35 g/ml.

In the present application, the bulk specific gravity of the doalkoxymagnesium means a value measured in accordance with JIS K6721 (1977).

When bulk specific gravity of the doalkoxymagnesium is within the above range, it is possible to easily provide a solid catalyst for olefin polymerization capable of producing polymer particles with a reduced content ratio of fine powder at high activity.

A method for producing the dialkoxy magnesium is illustrated in, for example, Japanese Patent Publication No. 03-074341, Japanese Patent Laid-Open No. 2013-095890, and International Publication No. WO 2013/058193.

The magnesium compound is preferably in a suspension state during reaction. Such a suspension state allows the reaction to proceed suitably.

The magnesium compound, when being solid, can be prepared into a magnesium compound suspension by suspending the magnesium compound in a solvent having no ability to solubilize the magnesium compound.

Examples of the vehicle having no ability to solubilize the solid magnesium compound include one or more solvents selected from a saturated hydrocarbon solvent and an unsaturated hydrocarbon solvent that do not dissolve the magnesium compound.

The tetravalent titanium halogen compound constituting the solid catalyst component for olefin polymerization according to the present invention is not particularly limited and is preferably one or more compounds selected from a titanium halide and an alkoxy titanium halide represented by the following general formula (I):

$$Ti(OR^1)_rX_{4-r} \qquad (I)$$

(in the formula, $R^1$ represents an alkyl group having 1 to 4 carbon atoms, X represents a halogen atom such as a chlorine atom, a bromine atom or an iodine atom, and r is 0 or an integer of 1 to 3, provided that, when a plurality of $R^1$ or X are present, $R^1$ or X may be the same as or different from each other).

Examples of the titanium halide include titanium tetrahalide such as titanium tetrachloride, titanium tetrabromide, and titanium tetraiodide.

Examples of the alkoxy titanium halide include one or more compounds selected from methoxy titanium trichloride, ethoxy titanium trichloride, propoxy titanium trichloride, n-butoxy titanium trichloride, dimethoxy titanium dichloride, diethoxy titanium dichloride, dipropoxy titanium dichloride, di-n-butoxy titanium dichloride, trimethoxy titanium chloride, triethoxy titanium chloride, tripropoxy titanium chloride and tri-n-butoxy titanium chloride.

The tetravalent titanium halogen compound is preferably titanium tetrahalide, more preferably titanium tetrachloride.

These titanium compounds may be used singly or in combinations of two or more thereof.

The internal electron-donating compound constituting the solid catalyst component is not particularly limited and is preferably an organic compound containing an oxygen atom or a nitrogen atom. Examples thereof include one or more compounds selected from alcohols, phenols, ethers, esters, ketones, acid halides, aldehydes, amines, amides, nitriles, isocyanates, and organosilicon compounds containing a Si—O—C bond or a Si—N—C bond.

The internal electron-donating compound is more preferably an ether compound such as a monoether, a diether or an ether carbonate and an ester such as a monocarboxylic acid ester or a polycarboxylic acid ester, and even more preferably one or more compounds selected from an aromatic polycarboxylic acid ester such as an aromatic dicarboxylic acid diester, an aliphatic polycarboxylic acid ester such as a saturated aliphatic polycarboxylic acid ester or an unsaturated aliphatic polycarboxylic acid ester, an alicyclic polycarboxylic acid ester, an diether and an ether carbonate.

The internal electron-donating compound is particularly preferably one or more compounds selected from di-n-butyl phthalate, di-n-propyl phthalate, diethyl phthalate, diethyl maleate, dibutyl maleate, dibutyl dimethylmaleate, dibutyl diethylmaleate, diethyl diisobutylmaleate, diethyl succinate, diethyl methylsuccinate, diethyl 2,3-diisopropylsuccinate, di-n-butyl malonate, diethyl malonate, dimethyl diisobutylmalonate, diethyl diisobutylmalonate, 2-isopropyl-2-isobutyl-1,3-dimethoxypropane, 2-isopropyl-2-isopentyl-1,3-dimethoxypropane, 9,9-bis(methoxymethyl)fluorene, (2-ethoxyethyl)ethyl carbonate, (2-ethoxyethyl)phenyl carbonate, dimethyl benzylidenemalonate, diethyl benzylidenemalonate and dibutyl benzylidenemalonate.

The details of conditions under which the magnesium compound, tetravalent titanium halogen compound and internal electron-donating compound are contacted with each other and pressurized to prepare a precursor and conditions under which the resulting precursor, titanium halogen compound and internal electron-donating compound are further contacted with each other are as mentioned in the description of the method for producing a solid catalyst component for olefin polymerization according to the present invention described later.

In the solid catalyst component for olefin polymerization according to the present invention, the content of a magnesium atom is preferably 10 to 70% by mass, more preferably 10 to 50% by mass, even more preferably 15 to 40% by mass and particularly preferably 15 to 25% by mass.

In the solid catalyst component for olefin polymerization according to the present invention, the content of a titanium atom is preferably 0.5 to 8.0% by mass, more preferably 0.5 to 5.0% by mass, and even more preferably 0.5 to 3.5% by mass.

In the solid catalyst component for olefin polymerization according to the present invention, the content of a halogen atom is preferably 20 to 88% by mass, more preferably 30 to 85% by mass, even more preferably 40 to 80% by mass, and still more preferably 45 to 75% by mass.

In the solid catalyst component for olefin polymerization according to the present invention, the content ratio of the internal electron-donating compound is preferably 1.5 to 30% by mass, more preferably 3.0 to 25% by mass and even more preferably 6.0 to 25% by mass.

In the present application, the content of the magnesium atom in the solid catalyst component means a value measured by an EDTA titration method which involves dissolving the solid catalyst component in a hydrochloric acid solution and titrating the magnesium atom with an EDTA solution.

In the present application, the content of the titanium atom in the solid catalyst component means a value measured in accordance with a method (redox titration) described in JIS 8311-1997 “Method for determination of titanium in titanium ores”.

In the present application, the content of the halogen atom in the solid catalyst component means a value measured by a silver nitrate titration method which involves treating the solid catalyst component with a mixed solution of sulfuric acid and pure water to prepare an aqueous solution, then sampling a predetermined amount, and titrating the halogen atom with a silver nitrate standard solution.

In the present application, the content of the internal electron-donating compound in the solid catalyst component means results determined using a calibration curve measured in advance on the basis of known concentrations when a sample is measured under the following conditions using gas chromatography (manufactured by Shimadzu Corp., GC-14B).

<Measurement Conditions>

Column: packed column (Φ2.6×2.1 m, Silicone SE-30 10%, Chromosorb WAW DMCS 80/100, manufactured by GL Sciences Inc.)

Detector: flame ionization detector (FID)

Carrier gas: helium, flow rate: 40 ml/min

Measurement temperature: vaporization chamber: 280° C., column: 225° C., detector: 280° C., or vaporization chamber: 265° C., column: 180° C., detector: 265° C.

The solid catalyst component for olefin polymerization according to the present invention has a cross-sectional pore area ratio (pore area ratio in the cross section of the solid catalyst component particle for olefin polymerization) of 10 to 50%, preferably 20 to 50%, more preferably 20 to 45% and even more preferably 25 to 40%.

In the solid catalyst component for olefin polymerization according to the present invention, the ratio $MX_i/MX_s$ of the cross-sectional pore area ratio ($MX_i$) in the region of less than 50% in the radial direction to the cross-sectional pore area ratio ($MX_s$) in the region of 50% or more in the radial direction from the particle center is 0.50 to 2.00, preferably 0.80 to 2.00, more preferably 1.00 to 2.00 and even more preferably 1.00 to 1.50.

In the present application, the center of a particle means the point of intersection (intersection point O in FIG. 7(*a*) and FIG. 7(*b*)) when an arbitrary particle cross-sectional image is contained in a rectangle (or square) and perpendicular lines are each drawn from the midpoint of two adjacent sides, as illustrated in FIG. 7(*a*) or FIG. 7(*b*).

Further, in the present application, the region of 50% or more in the radial direction from the particle center means a region located on and outside the boundary line with a reduced image obtained by (i) reducing pixel dimensions of the observation image (numerical values of the width and height of the observation image) to ½ and (ii) pasting an observation image in which only the number of pixels is restored to the original value on the original image. Further, in the present application, the region of 50% or more in the radial direction from the particle center means a region located inside the boundary line with the reduced image when an image obtained by (i) reducing the pixel dimensions of the observation image (numerical values of the width and height of the observation image) to ½ and (ii) pasting the observation image in which only the number of pixels is restored to the original value on the original image.

Specifically, (i) as illustrated in FIG. 8(*a*) described below, first read an observation image in which the entire particle portion is displayed in black, read and record the pixel dimensions of the image (numerical values of the width and height of the image), and then reduce the width and height of the pixel dimensions to ½, respectively, as shown in FIG. 8(*b*).

Next, (ii) restore only the number of pixels of the image to the original value as shown in FIG. 8(*c*), copy the entire image, and then read an image with two gradations shown in FIG. 8(*a*), as shown in FIG. 8(*d*), and paste the previously copied image of FIG. 8(*c*) on the image with two gradations in FIG. 8(*d*) as another layer (so that the particle centers coincide). At this point, in the central portion painted in black and the peripheral portion displayed with black dots illustrated in FIG. 8(*e*), the peripheral portion displayed with black dots (including the boundary line with the central portion) corresponds to a region of 50% or more in the radial direction, and the central portion painted in black (excluding the boundary line with the peripheral portion) corresponds to a region of less than 50% in the radial direction.

The morphology of the solid catalyst component for olefin polymerization according to the present invention is preferably truly spherical from the viewpoint of ease of measurement and the like, but even a solid catalyst component for olefin polymerization having a spherical or indefinite shape does not cause any measurement problems because the edges of the particle cross section are cut out in the subsequent analysis. Further, it is considered that polymer particles with a suppressed content ratio of fine powder and suppressed surface stickiness can be produced at high activity by using a solid catalyst component for olefin polymerization having the above cross-sectional pore area ratio $MX_s$ and average pore area ratio $MX_i/MX_s$.

In other words, since the reaction of the catalyst for olefin polymerization is a surface reaction, if there are many pores in the vicinity of the catalyst surface during olefin polymerization, reaction heat tends to accumulate, resulting in an explosive reaction and generation of refined polymer particles. Conversely, if there are few pores in the vicinity of the surface of the solid catalyst component, reaction heat is reduced because there is less heat accumulation. As a result, it is considered that the generation of fine powdery polymer is suppressed.

Therefore, it is considered that the present invention can easily provide a solid catalyst for olefin polymerization capable of producing polymer particles with a suppressed content ratio of fine powder and suppressed surface stickiness at high activity when subjected to polymerization of an olefin by using a solid catalyst component for olefin polymerization having the above cross-sectional pore area ratio and the ratio $MX_i/MX_s$ of the average pore area ratio.

In the present application, the cross-sectional pore area ratio or the ratio $MX_i/MX_s$ of the average pore area ratio of the solid catalyst component for olefin polymerization according to the present invention means a value on a cut surface when cutting is performed under a temperature condition of −70° C. or less, preferably −11° C., using a cooling cross-section machining device (cooling-type cross section polisher (CCP)) with no exposure to air in a state where a gold coating is provided as a thermally conductive coating on the surface of the solid catalyst component for olefin polymerization by physical vapor deposition (PVD).

The details of the method for cutting the solid catalyst component are as described below.

First, a solid catalyst component particle for olefin polymerization attached to a solid (substrate) or the like is placed in a sealed chamber, and gold as a film-forming substance (target) is evaporated at a high temperature under a nitrogen gas atmosphere and attached to the surface of the solid catalyst component particle for olefin polymerization to form a gold thin film by physical vapor deposition (PVD).

In the present application, a gold thin film means one formed by the following method.

Specifically, the gold thin film is formed by placing an ion sputter (JFC-1600, manufactured by JEOL Ltd.) equipped with a gold target for deposition and a rotating stage placed in a glove box for deposition work that is thoroughly purged with nitrogen, storing solid catalyst particles, a spatula, an aluminum shallow container and a silicon wafer (length 5 mm×width 10 mm×thickness 0.2 mm) to which a conductive double-sided tape has been attached in advance, thoroughly purging the inside of the glove box with nitrogen, then setting a plastic shallow vessel in which about 500 mg of the solid catalyst component is collected in the ion sputter and performing gold deposition while rotating the stage at a speed of 30 rpm for 3 to 15 minutes under conditions of an ultimate vacuum of 15 Pa or less and an applied current of 20 to 40 mA.

A gold coating on the surface not only reduces the contact with atmospheric moisture and oxygen but also easily suppresses charging due to high-temperature plasma during cutting described below to suppress the melting of the processed surface. Thus, the internal structure thereof can be analyzed with high accuracy.

Next, solid catalyst component particles for olefin polymerization having the gold coating on the surface are dispersed and fixed on the surface of the conductive double-sided tape attached to the silicon wafer to such an extent that the particles do not overlap each other and cut in a vacuum atmosphere of $10^{-3}$ Pa or less under a temperature condition of −70° C. or less, preferably −110° C. or less, using IB-19520 CCP manufactured by JEOL Ltd. as a cooling cross-section machining device (cooling-type cross section polisher (CCP)) with no exposure to air.

When the solid catalyst component particles are irradiated with an argon beam, the argon ion beam may be continuously applied until cross section machining is completed, but the cross section machining can also be performed by so-called intermittent measurement, in which the argon ion beam is repeatedly turned on and off for the solid catalyst component particles for a certain period.

By performing the cross section machining under the above temperature conditions, thermal damage to the solid catalyst component particles for olefin polymerization can be suppressed while performing the cross section machining with high accuracy.

Subsequently, JSM-F100 manufactured by JEOL Ltd. was used as a scanning electron microscope (SEM), the solid catalyst component particles for olefin polymerization that have already been subjected to cross section machining are set together with the transfer vessel removed from the CCP cross-section machining device to observe a backscattered electron image of the cross-section machined portion.

After the threshold is set, a binarized image of only the particle surface (flat portion) is created to obtain a target surface observation image.

FIG. 1 shows an example of a surface observation image of the particle cross-section processing site observed in such a manner.

In the cross section of the particle shown in Figure, a site shown in white indicates a texture portion (flat portion), and a site shown in black indicates a pore portion (concave portion).

In the solid catalyst component for olefin polymerization according to the present invention, arithmetic mean values of the cross-sectional pore area ratio, the cross-sectional pore area ratio in the region of 50% or more in the radial direction from the particle center and the cross-sectional pore area ratio in the region of less than 50% in the radial direction, which are determined by the following method using 500 solid catalyst components with a processed cross-section, are defined as the cross-sectional pore area ratio, the cross-sectional pore area ratio ($M'X_s$) in the region of 50% or more in the radial direction from the particle center and the cross-sectional pore area ratio ($M'X_i$) in the region of less than 50% in the radial direction, respectively.

In the solid catalyst component for olefin polymerization according to the present invention, arithmetic mean values of the cross-sectional pore area ratio, the cross-sectional pore area ratio in the region of 50% or more in the radial direction from the particle center and the cross-sectional pore area ratio in the region of less than 50% in the radial direction mean values calculated by the following methods through reading the resulting SEM observation image into a commercially available PC (personal computer) and using image analysis software (Photoshop, manufactured by Adobe Inc.) provided with an image with two gradation function and a function of measuring the luminance and the number of pixels in a specified range.

<Image Analysis Method>

(1) Identification of Image to be Analyzed

Image analysis software (Photoshop, manufactured by Adobe Inc.) is started, and the image of the particle cross section taken is read and gray-scaled (in a case where the image is already a monochrome image, this operation may not be performed).

Next, after changing the setting of "drawing color and background color" on the toolbox to "drawing color/background color=white/black", the region outside the outline portion of the particle image is removed by filling it with white, and the image that has only cross-sectional portion of a particle shown in FIG. 2 is saved.

(2) Calculation of Area of Particle Cross Section (Number of Pixels Constituting Entire Particle Cross Section)

The image of only a cross-sectional portion of a particle obtained in (1) is recalled to obtain a histogram (as illustrated in FIG. 3) that shows the distribution of the number of pixels with respect to the darkness (darkness 0 (white) to darkness 255 (black)) of each pixel constituting the image.

As illustrated in FIG. 3, a cursor (indicated by the symbol ▲) on the screen is moved such that when the mountain formed by the obtained histogram is one (unimodal), the rising portion (inflection point) at the left side skirt of the mountain serves as the threshold, and when the mountain formed by the obtained histogram is two or more (multimodal), the rising portion (inflection point) at the left side skirt of the rightmost mountain serves as the threshold. The two-gradation process is performed to obtain a cross-sectional image of the particle with two gradations as illustrated in FIG. 4, and the resulting image data is saved.

On the other hand, as illustrated in FIG. 5, the cursor (indicated by the symbol ▲) on the screen is moved to darkness 255 (black) to obtain an image in which the entire particle portion is displayed in black as illustrated in FIG. 6, and such image data is saved.

Next, in the resulting image data, the "average" value (average a) of the darkness and the number of "all pixels" (all pixels a) in the entire observation image are read from the "expanded display" of the histogram, and the number x of white pixels at this time is calculated by the following expression and then rounded to an integer value.

$$x=(\text{average } c)\times(\text{number of all pixels } a)/255$$

Then, the area of the particle cross-section in the entire observation image illustrated in FIG. 6 ((number of pixels (number of black pixels) constituting the entire particle cross section)) is calculated by the following expression.

Area of particle cross section(number of pixels constituting entire particle cross section)=(number of all pixels)−$x$ (3) Calculation of Pore Area (Number of Pixels Constituting Pore in Particle Cross Section) in Particle Cross Section The cross-sectional image of the particle with two gradations obtained in (2) as illustrated in FIG. 4 is recalled to read the "average" value (average b) of the darkness and the number of "all pixels" (all pixels a) in the entire observation image from the "expanded display" of the histogram, and the number x of white pixels at this time is calculated by the following expression and then rounded to an integer value.

$$y=(\text{average } b)\times(\text{number of all pixels } a)/255$$

Then, the pore area of the particle cross section in the entire observation image illustrated in FIG. 4 (number of black pixels) is calculated by the following expression.

Pore area(number of pixels constituting pore in particle cross section) in particle cross section=(number of all pixels)−$y$ (4) Calculation of Cross-Sectional Pore Area Ratio Based on the area of the particle cross section (the number of pixels constituting the entire particle cross section) and the pore area in the particle cross section (the number of pixels constituting the pores in the particle cross section) calculated in (2) and (3) above, the cross-sectional pore area ratio is calculated by the following equation.

Surface pore area ratio (%)={pore area in particle cross section(number of pixels constituting pore in particle cross section)/area of particle cross section(number of pixels constituting entire particle cross section)}×100

In the present application, the arithmetic mean value of the cross-sectional pore area ratios of the 500 solid catalyst components for olefin polymerization obtained by the above method is defined as the cross-sectional pore area ratio.

(5) Calculation of Cross-Sectional Pore Area Ratio in Inner Particle Region (Center of Particle Cross Section) of Less than 50% in Radial Direction FIG. 8 is a view for illustrating a method for calculating a cross-sectional pore area ratio in the inner particle region (central portion of particle cross section) of less than 50% in the radial direction.

As illustrated in FIG. 8(*a*), an observation image in which the entire particle portion is displayed in black is read, and the pixel dimensions of the image (numerical values of the width and height of the image) are recorded. Then the width and height of the pixel dimensions are reduced to ½ as shown in FIG. 8(*b*). Next, only the number of pixels of the image is restored to the original value as shown in FIG. 8(*c*) to copy the entire image.

Then, an image with two gradations shown in FIG. 8(*a*) is read, as shown in FIG. 8(*d*), and the previously copied image of FIG. 8(*c*) is subsequently pasted on the image with two gradations as another layer.

The central black portion pasted as another layer in FIG. 8(*e*) is selected as shown in FIG. 8(*f*), and then the selected region is inverted as shown in FIG. 8(*g*). As shown in FIG. 8(*h*), the region selected from the lower layer is deleted in this state, and then all the upper layers are deleted as shown in FIG. 8(*i*) to obtain an image in a state where a site from the central part of the particle to 50% in the radial direction is subjected to two gradations.

Using the above method, a cross-sectional image in which the entire particle portion shown in FIG. 6 is displayed in black is obtained from the image shown on the left side of FIG. 9 (cross-sectional image of the particle with two gradations obtained in (2) as shown in FIG. 4), and an image in a state where a site from the central part of the particle to 50% in the radial direction is subjected to two gradations as shown on the right side of FIG. 9 can be obtained by using such cross-sectional images.

Next, in the image data shown on the right side of FIG. 9, the "average" value (average c) of the darkness and the number of "all pixels" (all pixels c) are read from the "expanded display" of the histogram, and the number z of white pixels in the entire observation image at this time is calculated by the following expression and then rounded to an integer value.

$$z=(\text{average } c)\times(\text{all pixels } c)/255$$

In the image data of the inner particle region (at the center of the cross section) of less than 50% in the radial direction according to the right side of FIG. 9, when the particle cross sections shown on the right and left sides of FIG. 9 are each assumed to be a perfect circle, the radius of the particle cross section shown on the right side of FIG. 8 (FIG. 8(*b*)) is ½ of the radius of the particle cross section shown on the left side of FIG. 9. Therefore, the area of the entire particle cross section (number of black pixels) on the right side of FIG. 8 is mathematically ¼ of the area of the entire particle cross section (number of black pixels) in the entire observation image on the left side of FIG. 9. Thus, the pore area (number of black pixels) in the inner particle region (central portion of the particle cross-section) of less than 50% in the radial direction shown on the right side of FIG. 9 can be calculated by the following expression.

Pore area at central portion of particle cross section=[{(all pixels $a$)−$x$}×0.25]−$z$ In addition, the total cross-sectional area in the inner particle region (central portion of particle cross section) of less than 50% in the radial direction shown on the right side of FIG. 9 can be calculated by the following expression.

Total cross-sectional area in inner particle region (central portion of particle cross section) of less than 50% in radial direction={(all pixels $a$)−$x$}×0.25

Accordingly, the cross-sectional pore area ratio ($MX_i$) in the inner particle region (central portion of particle cross section) of less than 50% in the radial direction can be calculated by the following expression.

Cross-sectional pore area ratio ($MX_i$)(%) in inner particle region(central portion of particle cross section) of less than 50% in radial direction=(pore area at central portion of particle cross section/total cross-sectional area at center of particle cross section)×100

(6) Calculation of Cross-Sectional Pore Area Ratio in Vicinity of Surface Region (Edge of Particle Cross Section) of 50% or More in Radial Direction The total area (number of black pixels) in the vicinity of the surface region (edge of particle cross section) of 50% or more in the radial direction is ¾ of the total particle cross-sectional area (number of black pixels) in the entire observation image in FIG. 9 for the same reason described in (5) above for calculating the total cross-sectional area of the inner particle region (at the center of particle cross section) of less than 50% in the radial direction. Therefore, the total area in the vicinity of the surface region (edge of the particle cross section) of 50% or more in the radial direction can be calculated by the following expression.

$$\text{Total area at edge of particle cross section}=[\{(\text{all pixels } a)-x\}\times 0.75]$$

In addition, the total pore area in the vicinity of the surface region (edge of the particle cross section) of 50% or more in the radial direction can be calculated by the following expression.

$$\text{Pore area at edge of particle cross section}=(\text{pore area of entire particle cross section})-(\text{pore area at central portion of particle cross section})$$

Accordingly, the cross-sectional pore area ratio ($MX_s$) in the vicinity of the surface region (edge of the particle cross section) of 50% or more in the radial direction can be calculated by the following expression.

$$\text{Cross-sectional pore area ratio } (MX_s)(\%) \text{ in vicinity of surface region(edge of particle cross section) of 50\% or more in radial direction}=(\text{pore area at central portion of particle cross section}/\text{total area at edge of particle cross section})\times 100$$

(7) Calculation of Ratio $MX_i/MX_s$ of Cross-Sectional Pore Area Ratio ($MX_i$) in Region of Less than 50% in Radial Direction to Cross-Sectional Pore Area Ratio ($MX_s$) in Region of 50% or More in Radial Direction from Particle Center The arithmetic mean value of the cross-sectional pore area ratio in the vicinity of the surface region of 50% or more in the radial direction of 500 solid catalyst components for olefin polymerization obtained by the above method is determined as a cross-sectional pore area ratio (MXC) in the region of 50% or more in the radial direction. Further, the arithmetic mean value of the cross-sectional pore area ratio in the inner particle region of less than 50% in the radial direction of 500 solid catalyst components for olefin polymerization obtained by the above method is determined as a cross-sectional pore area ratio ($MX_i$) in the region of less than 50% in the radial direction, whereby the ratio $MX_i/MX_s$ of the cross-sectional pore area ratio ($MX_i$) in the region of less than 50% in the radial direction to the cross-sectional pore area ratio ($MX_s$) in the region of 50% or more in the radial direction can be calculated.

The solid catalyst component for olefin polymerization according to the present invention may contain 5 to 20% by mass of a liquid hydrocarbon compound.

The hydrocarbon compound is preferably one or more selected from compounds represented by the general formula $C_nH_{(2n=2)}$ (where n is an integer of 5 to 20).

The "liquid hydrocarbon compound" according to the present embodiment refers to a compound that is liquid at ordinary temperature and has a boiling point of 50 to 150° C. Examples of the hydrocarbon compound represented by general formula (I) include one or more selected from pentane, hexane, heptane, octane, nonane, decane, dodecane, tridecane, pentadecane, icosane and mineral oil (liquid paraffin).

The content of the liquid hydrocarbon contained in the solid catalyst component for olefin polymerization according to the present invention can be calculated from the following expression by taking about 10 g of the solid catalyst component in a 100 ml round-bottom flask that has purged with nitrogen in advance, recording the weighed value M (g), then drying under reduced pressure using a vacuum pump (model number: G-100D, manufactured by ULVAC, Inc.) at 50° C. or more for 2 hours or more depending on the boiling point of the hydrocarbon, cooling to ordinary temperature, bringing the inside of the round-bottom flask to normal pressure with nitrogen gas to measure the weighed value N (g) of the dried product.

$$\text{Liquid hydrocarbon content (\% by mass) in solid catalyst component}=[\{M(g)-N(g)\}/M(g)]\times 100$$

The solid catalyst component for olefin polymerization according to the present invention may contain the above liquid hydrocarbon in its internal pores, for example.

When the solid catalyst component for olefin polymerization according to the present invention contains liquid hydrocarbon, the cross-sectional pore area ratio or the average pore area ratio $MX_i/MX_s$ of the solid catalyst component for olefin polymerization according to the present invention described above is determined through surface observation with the SEM after cutting with a cooling cross-section machining device (cooling-type cross section polisher (CCP)) with no exposure to air, followed by washing treatment.

When the liquid hydrocarbon is hexane, heptane or the like having a boiling point of 100° C. or less, the washing treatment method can be performed by drying under reduced pressure using a vacuum pump (model number: G-100D, manufactured by ULVAC, Inc.) or by drying under airflow in a nitrogen atmosphere to remove the liquid hydrocarbon. Meanwhile, when the liquid hydrocarbon is decane, dodecane or the like having a boiling point of 100° C. or more, the washing treatment method can be performed by allowing a small amount of hexane or heptane to flow onto the particle cross section of the cut solid catalyst component, followed by drying under reduced pressure using a vacuum pump (model number: G-100D, manufactured by ULVAC, Inc.) or by drying under airflow in a nitrogen atmosphere to remove the liquid hydrocarbon.

The present invention can provide a solid catalyst component for olefin polymerization capable of producing polymer particles with a suppressed content ratio of fine powder and suppressed surface stickiness at high activity when subjected to polymerization of an olefin.

The solid catalyst component for olefin polymerization according to the present invention can be suitably prepared by the production method according to the present invention described below.

Next, the method for producing a solid catalyst component for olefin polymerization according to the present invention will be described.

The method for producing a solid catalyst component for olefin polymerization according to the present invention includes contacting a magnesium compound, a tetravalent titanium halogen compound and an internal electron-donating compound with each other, followed by pressurization to prepare a precursor, and further contacting the precursor, a tetravalent titanium halogen compound and an internal electron-donating compound with each other.

The method for producing a solid catalyst component for olefin polymerization according to the present invention can also be expressed as having: a precursor preparation step of contacting a magnesium compound, a tetravalent titanium halogen compound and an internal electron-donating compound with each other, followed by pressurization to prepare a precursor; and a main preparation step of further contacting the precursor obtained in the precursor preparation step, a tetravalent titanium halogen compound and an internal electron-donating compound with each other.

In the method for producing a solid catalyst component for olefin polymerization according to the present invention, specific examples of the magnesium compound used in the production of the precursor include those described above. Specific examples of the tetravalent titanium halogen compound and the internal electron-donating compound used in the production of the precursor include those described above.

In the method for producing a solid catalyst component for olefin polymerization according to the present invention, the precursor is preferably formed by mixing the magnesium compound, the tetravalent titanium halogen compound and the internal electron-donating compound under pressure in a pressurized state under an inert gas atmosphere in the presence of an appropriate inert organic solvent to contact and react them.

The amount of the tetravalent titanium halogen compound to be contacted for reaction per 1 mol of the magnesium compound is preferably 0.5 to 100 mol, more preferably 0.5 to 50 mol and even more preferably 1 to 10 mol.

Further, the amount of the internal electron-donating compound to be contacted for reaction per 1 mol of the magnesium compound is preferably 0.01 to 10 mol, more preferably 0.01 to 1 mol and even more preferably 0.02 to 0.6 mol.

When the magnesium compound, the tetravalent titanium halide, and the internal electron-donating compound are contacted with each other, the tetravalent titanium halogen compound and the internal electron-donating compound may be contacted with each other in a state where a complex is formed in advance.

In the complex of the tetravalent titanium halogen compound and the internal electron-donating compound, the amount of the internal electron-donating compound to be contacted for reaction per 1 mol of the tetravalent titanium halogen compound is preferably 0.5 mol, 1 mol or 2 mol and more preferably 1 mol.

The amount of the complex of the tetravalent titanium halogen compound and the internal electron-donating compound to be contacted for reaction per 1 mol of the magnesium compound is preferably 5 to 200 mol and more preferably 20 to 150 mol.

In the case of using an inert organic solvent, the inert organic solvent is preferably a saturated hydrocarbon solvent or an unsaturated hydrocarbon solvent which hardly exhibits solubility in a magnesium compound.

Because of high safety and industrial versatility, specific examples thereof include a linear or branched aliphatic hydrocarbon compound having a boiling point of 50 to 200° C. selected from hexane, heptane, decane, methyl heptane and the like; an alicyclic hydrocarbon compound having a boiling point of 50 to 200° C. selected from cyclohexane, ethylcyclohexane, decahydronaphthalene and the like; and an aromatic hydrocarbon compound having a boiling point of 50 to 200° C. selected from toluene, xylene, ethylbenzene and the like. Among them, preferred are linear aliphatic hydrocarbon compounds having a boiling point of 50 to 200° C. selected from hexane, heptane, decane and the like; and aromatic hydrocarbon compounds having a boiling point of 50 to 200° C. selected from toluene, xylene, ethylbenzene and the like. These solvents may be used alone or in combination of two or more.

The amount of the inert organic solvent used per mol of the magnesium compound is preferably 0.001 to 500 mol, more preferably 0.5 to 100 mol and even more preferably 1.0 to 20 mol.

The temperature during the contact and reaction among the magnesium compound, the tetravalent titanium halogen compound and the internal electron-donating compound is preferably 20 to 105° C., more preferably 20 to 100° C. and even more preferably 25 to 90° C. The reaction time is preferably 1 to 240 minutes, more preferably 1 to 180 minutes and even more preferably 30 to 180 minutes.

Examples of the inert gas constituting the inert gas atmosphere during the contact and reaction of the magnesium compound, the tetravalent titanium halogen compound, and the internal electron-donating compound include one or more selected from nitrogen gas, helium gas, neon gas, argon gas, krypton gas, xenon gas and the like. Given the cost, nitrogen gas or argon gas is preferred, and nitrogen gas is more preferred.

The applied pressure (gauge pressure) during the contact and reaction of the magnesium compound, the tetravalent titanium halogen compound and the internal electron-donating compound is preferably 0.01 to 0.9 MPa and more preferably 0.11 to 0.9 MPa.

In the method for producing a solid catalyst component for olefin polymerization according to the present invention, the precursor is prepared by contacting the magnesium compound, the tetravalent titanium halogen compound, and the internal electron-donating compound with each other and reacting them under an inert gas atmosphere and under pressure, whereby the formation of fine powdery catalyst particles, which are responsible for the formation of fine polymer particles, can be suppressed. Furthermore, the structure of the resulting solid catalyst component can be changed, and the solid catalyst component may have excellent strength compared with the contact and reaction product under non-pressurized conditions.

In the preparation of the precursor, the contact and reaction of the magnesium compound, the tetravalent titanium halogen compound and the internal electron-donating compound can be carried out, for example, by charging the magnesium compound, the tetravalent titanium halogen compound and the internal electron-donating compound and, if necessary, an inert organic solvent into an autoclave filled with inert gas and capable of being pressurized and pressurizing the inside of the autoclave while stirring with a stirrer.

The resulting precursor preferably has a cross-sectional pore area ratio (pore area ratio in the cross section of the precursor particle) of 10 to 50%, more preferably 20 to 50%, even more preferably 20 to 45% and particularly preferably 25 to 40%.

In the resulting precursor, the ratio $M''X_i/M''X_s$ of the cross-sectional pore area ratio ($M'X_i$) in the region of less than 50% in the radial direction to the cross-sectional pore area ratio ($M''X_s$) in the region of 50% or more in the radial direction from the particle center is preferably 0.50 to 2.00, more preferably 0.80 to 2.00, even more preferably 1.00 to 2.00 and particularly preferably 1.00 to 1.50.

It is considered that the present invention can easily provide a solid catalyst for olefin polymerization capable of producing polymer particles with a suppressed content ratio of fine powder and suppressed surface stickiness at high activity by using a precursor having the cross-sectional pore area ratio and average pore area ratio $M''X_i/M''X_s$.

In other words, since the reaction of the catalyst for olefin polymerization is a surface reaction, if there are many pores in the vicinity of the catalyst surface during olefin polymerization, reaction heat tends to accumulate, resulting in an explosive reaction and generation of refined polymer particles. Conversely, if there are few pores in the vicinity of the surface of the solid catalyst component, reaction heat is reduced because there is less heat accumulation. As a result, it is considered that the generation of fine powdery polymer is suppressed.

In the present application, the cross-sectional pore area ratio of the precursor and the ratio $M''X_i/M''X_s$ of the cross-sectional pore area ratio ($M''X_i$) in the region of less than 50% in the radial direction to the cross-sectional pore area ratio ($M''X_s$) in the region of 50% or more in the radial direction from the particle center each mean a value on a cut surface when cutting is performed under a temperature condition of −70° C. or less using a cooling cross-section machining device with no exposure to air in a state where a thermally conductive coating is provided on the surface. The details of the cutting method are the same as the method for cutting the solid catalyst component for olefin polymerization according to the present invention described above.

The cross-sectional pore area ratio of the precursor and $M''X_i/M''X_s$ mean values measured by the same methods as those for the above-mentioned cross-sectional pore area ratio of the solid catalyst component for olefin polymerization according to the present invention and the ratio $MX_i/MX_s$ of the cross-sectional pore area ratio ($MX_i$) in the region of less than 50% in the radial direction to the cross-sectional pore area ratio ($MX_s$) in the region of 50% or more in the radial direction.

In the precursor, arithmetic mean values of the cross-sectional pore area ratio, the cross-sectional pore area ratio in the region of 50% or more in the radial direction from the particle center and the cross-sectional pore area ratio in the region of less than 50% in the radial direction, which are determined by the same method as described above after cutting 500 precursor particles using the method described above, are defined as the cross-sectional pore area ratio, the cross-sectional pore area ratio ($M''X_s$) in the region of 50%, or more in the radial direction from the particle center and the cross-sectional pore area ratio ($M''X_i$) in the region of less than 50% in the radial direction, respectively.

In the method for producing a solid catalyst component for olefin polymerization according to the present invention, the precursor is further subjected to a main preparation step of contacting with a tetravalent titanium halogen compound and an internal electron-donating compound to prepare a solid catalyst component for olefin polymerization.

In the main preparation step, specific examples of the tetravalent titanium halogen compound and the internal electron-donating compound to be contacted with the precursor include those described above, and each may be the same as or different from the tetravalent titanium halogen compound and the internal electron-donating compound used in the preparation step of the precursor.

In the main preparation step, the catalyst reaction of the precursor with the tetravalent titanium halogen compound and the internal electron-donating compound is preferably performed under an inert gas atmosphere. The inert gas constituting the inert gas atmosphere may be the same as the gas used in the preparation step of the precursor described above.

The amount of the precursor and the tetravalent titanium halogen compound to be contacted for reaction per 1 mol of the magnesium compound in the precursor is preferably 0.5 to 100 mol, more preferably 0.5 to 50 mol and even more preferably 1 to 10 mol.

The amount of the precursor and the internal electron-donating compound to be contacted for reaction per 1 mol of the magnesium compound in the precursor is preferably 0.01 to 10 mol, more preferably 0.01 to 1 mol and even more preferably 0.02 to 0.6 mol.

Furthermore, the contact reaction of the precursor with the tetravalent titanium halogen compound and the internal electron-donating compound in the main preparation step may be performed in the presence of an inert organic solvent. In the case of using an inert organic solvent, the amount of the inert organic solvent used per 1 mol of the magnesium compound is preferably 0.001 to 500 mol, more preferably 0.5 to 100 mol and even more preferably 1.0 to 20 mol. Specific examples of the inert organic solvent include those used in the preparation step of the precursor described above.

The temperature during the contact reaction of the precursor with the tetravalent titanium halogen compound and the internal electron-donating compound in the main preparation step is preferably 20 to 105° C., more preferably 20 to 100° C. and even more preferably 25 to 90° C. The contact reaction time of the precursor with the tetravalent titanium halogen compound and the internal electron-donating compound is preferably 1 to 240 minutes, more preferably 1 to 180 minutes and even more preferably 30 to 180 minutes.

The contact and reaction of the magnesium compound, tetravalent titanium halogen compound and internal electron-donating compound in the above precursor preparation step and main preparation step may be carried out in the presence of another electron-donating compound as the third component. Examples of the other electron-donating compound include an organic compound containing oxygen or nitrogen, such as one or more selected from an alcohol, a phenol, an ether, an ester, a ketone, an acid halide, an aldehyde, an amine, an amide, a nitrile, an isocyanate and a polysiloxane.

The polysiloxane is a polymer having a siloxane bond (—Si—O— bond) in the backbone. The polysiloxane, also generally called silicone oil, means chain, partially hydrogenated, cyclic or modified polysiloxane that is liquid or viscous at ordinary temperature and has a viscosity of 0.02 to 100 cm2/s (2 to 10000 cSt), more preferably 0.03 to 5 $cm^2/s$ (3 to 500 cSt), at 25° C.

Examples of the chain polysiloxane include: hexamethyldisiloxane, hexaethyldisiloxane, hexapropyldisiloxane, hexaphenyldisiloxane 1,3-divinyltetramethyldisiloxane, 1,3-dichlorotetramethyldisiloxane, 1,3-dibromotetramethyldisiloxane, chloromethylpentamethyldisiloxane, and 1,3-bis(chloromethyl)tetramethyldisiloxane as disiloxane; and dimethylpolysiloxane and methylphenylpolysiloxane as polysiloxane other than disiloxane. Examples of the partially hydrogenated polysiloxane include methyl hydrogen polysiloxane having a hydrogenation rate of 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane. Examples of the modified polysiloxane include higher fatty acid group-substituted dimethylsiloxane, epoxy group-substituted dimethylsiloxane, and polyoxyalkylene group-substituted dimethylsiloxane. Among them, decamethylcyclopentasiloxane or dimethylpolysiloxane is preferred, and decamethylcyclopentasiloxane is particularly preferred.

In the above precursor preparation step and main preparation step, it is preferable to bring, for example, the magnesium compound, the tetravalent titanium halogen compound and the internal electron-donating compound (and optionally polysiloxane) with each other to effect a reaction in the presence of an inert organic solvent.

The inert organic solvent is preferably an organic solvent that is liquid at ordinary temperature (20° C.) and has a boiling point of 50 to 150° C., more preferably an aromatic hydrocarbon compound or a saturated hydrocarbon compound that is liquid at ordinary temperature and has a boiling point of 50 to 150° C.

Specific examples of the inert organic solvent include one or more compounds selected from: linear aliphatic hydrocarbon compounds such as hexane, heptane, and decane; branched aliphatic hydrocarbon compounds such as methylheptane; alicyclic hydrocarbon compounds such as cyclohexane, methylcyclohexane, and ethylcyclohexane; and aromatic hydrocarbon compounds such as toluene, xylene, and ethylbenzene.

Among these inert organic solvents, an aromatic hydrocarbon compound that is liquid at ordinary temperature and has a boiling point of 50 to 150° C. is preferred because the aromatic hydrocarbon compound can improve the activity of the resulting solid catalyst component and improve the stereoregularity of the resulting polymer.

After the completion of the reaction in the above precursor preparation step or main preparation step, it is preferable to wash the resulting reaction product after allowing the reaction solution to stand, appropriately removing a supernatant liquid to achieve a wet state (slurry state) or optionally drying the reaction solution by hot-air drying, vacuuming with a vacuum pump or the like.

The washing treatment is usually performed using a washing solution.

Examples of the washing solution include the same as the inert organic solvent described above. Preferred are one or more compounds selected from linear aliphatic hydrocarbon compounds that are liquid at ordinary temperature and have a boiling point of 50 to 150° C., such as hexane, heptane, and decane, cyclic aliphatic hydrocarbon compounds that are liquid at ordinary temperature and have a boiling point of 50 to 150° C., such as methylcyclohexane and ethylcyclohexane, aromatic hydrocarbon compounds that are liquid at ordinary temperature and have a boiling point of 50 to 150° C., such as toluene, xylene, ethylbenzene, and o-dichlorobenzene, and the like.

Use of the washing solution can facilitate dissolving and removing by-products or impurities from the reaction product.

The washing treatment is preferably performed at a temperature equal to or less than the boiling point of the washing liquid used and more preferably at a temperature equal to or less than 90° C.

The washing treatment is preferably performed by adding a desired amount of the washing solution to the reaction product, stirring the mixture, and then removing the liquid phase by a filtration method or a decantation method.

After the contact and reaction of the components, impurities of unreacted starting material components or reaction by-products (alkoxy titanium halide, titanium tetrachloride-carboxylic acid complex, etc.) remaining in the reaction product can be removed by the washing treatment.

The contact reaction product of the components is usually in the form of a suspension. The product in the form of a suspension may be allowed to stand, in which the supernatant liquid is removed to achieve a wet state (slurry state), and optionally be dried by hot-air drying or vacuuming with a vacuum pump to give a target solid catalyst component.

The details of the solid catalyst component for olefin polymerization obtained through the production method of the present invention are as mentioned in the description of the solid catalyst component for olefin polymerization according to the present invention.

The present invention can provide a method for producing the solid catalyst component for olefin polymerization capable of producing polymer particles with a suppressed content ratio of fine powder and reduced surface stickiness at high activity when subjected to polymerization of an olefin.

Next, the catalyst for olefin polymerization according to the present invention will be described.

The catalyst for olefin polymerization according to the present invention contains:

(A) the solid catalyst component for olefin polymerization according to the present invention, and (B) an organoaluminum compound.

The details of (A) the solid catalyst component for olefin polymerization according to the present invention are as described above.

Examples of the organoaluminum compound (B) include one or more selected from triethylaluminum, diethylaluminum chloride, triisobutylaluminum, diethylaluminum bromide, diethylaluminum hydride, ethoxydichloroaluminum, diisopropoxyaluminum, isopropoxychloraluminum, triethoxyaluminum and triisopropoxyaluminum. One or more selected from ethoxydichloroaluminum, diisopropoxyaluminum, isopropoxychloraluminum, triethoxyaluminum, triisopropoxyaluminum and the like are preferred.

The solid catalyst for olefin polymerization according to the present invention may further contain (C) an external electron-donating compound.

Examples of the external electron-donating compound (II) include one or more organosilicon compounds selected from an organosilicon compound represented by the following general formula (II):

$$R^2_qSi(OR^3)_{4-q} \quad (II)$$

(in the formula, $R^2$ is an alkyl group having 1 to 12 carbon atoms, a cycloalkyl group having 3 to 12 carbon atoms, a phenyl group, a vinyl group, an allyl group or an aralkyl group, provided that $R^3$, when present in a plurality, may be the same as or different from each other; $R^3$ is an alkyl group having 1 to 4 carbon atoms, a cycloalkyl group having 3 to 6 carbon atoms, a phenyl group, an alkylamino group having 1 to 12 carbon atoms, a dialkylamino group having 1 to 12 carbon atoms, a vinyl group, an allyl group or an aralkyl group, provided that $R^3$, when present in a plurality, may be the same as or different from each other; and q is an integer of 0 to 3) and an organosilicon compound represented by the following general formula (III):

$$(R^4R^5N)_sSiR^6_{4-s} \quad (III)$$

(in the formula, $R^4$ and $R^5$ are a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms or an aryl group, provided that $R^4$ and $R^5$ are the same as or different from each other and optionally bond to each other to form a ring; $R^6$ is a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms or an aryl group, provided that, when a plurality of $R^6$ are present, the plurality of $R^6$ may be the same as or different from each other; and s is an integer of 1 to 3).

Examples of the organosilicon compound represented by the general formula (II) include one or more selected from phenylalkoxysilane, alkylalkoxysilane, phenylalkylalkoxysilane, cycloalkylalkoxysilane, cycloalkylalkylalkoxysilane and alkoxysilane.

The preferred organosilicon compound represented by the general formula (IV) is specifically one or more compounds selected from di-n-propyldimethoxysilane, diisopropyldimethoxysilane, di-n-butyldimethoxysilane, diisobutyldimethoxysilane, di-t-butyldimethoxysilane, di-n-butyldiethoxysilane, t-butyltrimethoxysilane, dicyclohexyldimethoxysilane, dicyclohexyldiethoxysilane, cyclohexylmethyldimethoxysilane, cyclohexylmethyldiethoxysilane, cyclohexylethyldimethoxysilane, cyclohexylethyldiethoxysilane, dicyclopentyldimethoxysilane, dicyclopentyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane and 3,5-dimethylcyclohexylcyclopentyldimethoxysilane.

The preferred organosilicon compound represented by the general formula (III) is one or more selected from t-butylmethylbis(ethylamino)silane, bis(ethylamino)dicyclohexylsilane, dicyclopentylbis(ethylamino)silane, bis(perhydroisoquinolino)dimethoxysilane and diethylaminotriethoxysilane.

Examples of the external electron-donating compound (C) include an ether compound having two or more ether groups. The preferred ether compound is a 2-substituted 1,3-diether. Examples of the 2-substituted 1,3-diether include a compound represented by the following general formula (IV):

$$R^7—O—CH_2CR^8R^9CH_2—O—R^{10} \quad (IV)$$

(in the formula, $R^8$ and $R^9$ are a hydrogen atom, a halogen atom, an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a halogen-substituted aromatic hydrocarbon group having 6 to 12 carbon atoms, a substituted aromatic hydrocarbon group having 7 to 12 carbon atoms, an alkylamino group having 1 to 12 carbon atoms, or a dialkylamino group having 2 to 12 carbon atoms, provided that $R^8$ and $R^9$ are the same as or different from each other and optionally bond to each other to form a ring; and $R^7$ and $R^{10}$ are an alkyl group having 1 to 12 carbon atoms, a vinyl group, an alkenyl group having 3 to 12 carbon atoms, a cycloalkyl group having 3 to 6 carbon atoms, an aromatic hydrocarbon group having 6 to 12 carbon atoms, a halogen-substituted aromatic hydrocarbon group having 6 to 12 carbon atoms or a substituted aromatic hydrocarbon group having 7 to 12 carbon atoms, provided that $R^7$ and $R^{10}$ are the same as or different from each other).

Specific examples of the 2-substituted 1,3-diether include 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane and 9,9-bis(methoxymethyl)fluorene. Among these, 2-isopropyl-2-isobutyl-1,3-dimethoxypropane, 2-isopropyl-2-isopentyl-1,3-dimethoxypropane, 9,9-bis(methoxymethyl)fluorene and the like are preferred. These compounds may be used alone or in combination of two or more.

In the catalyst for olefin polymerization according to the present invention, the content ratio of the solid catalyst component for olefin polymerization (A), the organoaluminum compound (B) and the external electron-donating compound (C), which can be optionally selected as long as the effect of the present invention can be achieved, is not particularly limited.

The catalyst for olefin polymerization according to the present invention preferably contains the organoaluminum compound (B) in an amount of 1 to 2,000 mol and more preferably 50 to 1,000 mol, per mol of the titanium atoms constituting the solid catalyst component for olefin polymerization according to the present invention (A).

In addition, the catalyst for olefin polymerization according to the present invention preferably contains the external electron-donating compound (C) in an amount of 1 to 200 mol, more preferably 2 to 150 mol and even more preferably 5 to 100 mol, per mol of the titanium atoms constituting the solid catalyst component for olefin polymerization according to the present invention (A).

The catalyst for olefin polymerization according to the present invention can be produced by contacting the solid catalyst component for olefin polymerization according to the present invention (A), the organoaluminum compound (B) and, if necessary, the external electron-donating compound (C) with each other.

In the method for producing the catalyst for olefin polymerization according to the present invention, the components may be contacted with one another in any order, and examples of the order of contact are as follows:

(i) the solid catalyst component for olefin polymerization according to the present invention (A)→the external electron-donating compound (C)→the organoaluminum compound (B);

(ii) the organoaluminum compound (B)→the external electron-donating compound (C)→the solid catalyst component for olefin polymerization according to the present invention (A);

(iii) the external electron-donating compound (C)→the solid catalyst component for olefin polymerization according to the present invention (A)→the organoaluminum compound (B); and (iv) the external electron-donating compound (C)→the organoaluminum compound (B)→the solid catalyst component for olefin polymerization according to the present invention (A).

In the contact examples (i) to (iv), the contact example (ii) is preferred.

Note that in the contact examples (i) to (iv), the symbol "→" indicates the order of contact. For example, "the solid catalyst component for olefin polymerization according to the present invention (A)→the organoaluminum compound (B)→(γ) an external electron-donating compound" means that the organoaluminum compound (B) is contacted with the solid catalyst component for olefin polymerization according to the present invention (A), and then, the external electron-donating compound (C) is added to the mixture and contacted with each other.

In the method for producing the catalyst for olefin polymerization according to the present invention, the solid catalyst component for olefin polymerization, the organoaluminum compound and the external electron-donating compound (C) added if necessary, may be contacted with each other in the absence of an olefin or in the presence of an olefin (in a polymerization system).

The contact among the solid catalyst component for olefin polymerization according to the present invention (A), the organoaluminum compound (B) and the external electron-donating compound (C) is preferably performed in an inert gas (such as argon or nitrogen) atmosphere or a monomer (such as propylene) atmosphere in order to prevent deterioration in the solid catalyst component for olefin polymerization or the catalyst for olefin polymerization after production.

The contact is also preferably performed in the presence of a dispersion medium such as an inert solvent in consideration of the easiness of operation. An aliphatic hydrocarbon compound such as hexane, heptane, or cyclohexane, an aromatic hydrocarbon compound such as benzene, toluene, xylene or ethylbenzene, or the like is used as the inert solvent. Aliphatic hydrocarbon is preferred. Among others, hexane, heptane and cyclohexane is more preferred.

The contact temperature for the contact among the components is preferably −10° C. to 100° C., more preferably 0° C. to 90° C. and even more preferably 20° C. to 80° C. The contact time is preferably 1 minute to 10 hours, more preferably 10 minutes to 5 hours and even more preferably 30 minutes to 2 hours.

The contact temperature and the contact time that fall within the ranges described above facilitate improving the polymerization activity of the catalyst for olefin polymerization and the stereoregularity of the resulting polymer, and consequently facilitate improving the mechanical properties, workability and productivity of the resulting olefin polymer.

The present invention can provide a method for producing the catalyst for olefin polymerization capable of producing polymer particles with a suppressed content ratio of fine powder and suppressed surface stickiness at high activity when subjected to polymerization of an olefin.

Next, the method for producing an olefin polymer particle according to the present invention will be described.

The method for producing an olefin polymer particle according to the present invention includes polymerizing an olefin using an olefin polymerization catalyst according to the present invention.

In the method for producing an olefin polymer particle according to the present invention, the polymerization of an olefin may be homopolymerization or copolymerization.

In the method for producing an olefin polymer particle according to the present invention, the olefin to be polymerized is preferably an α-olefin having 2 to 8 carbon atom, is preferably ethylene or propylene when the polymerization of the olefin is homopolymerization and is more preferably a monomer of propylene and another α-olefin having 2 to 8 carbon atoms (excluding an α-olefin having 3 carbon atoms) when the polymerization of the olefin is copolymerization. The other α-olefin to be copolymerized with propylene is preferably one or more selected from ethylene, 1-butene, 1-pentene, 4-methyl-1-pentene, vinylcyclohexane and the like, more preferably ethylene or 1-butene and even more preferably ethylene.

The amount of the other α-olefin subjected to the copolymerization with propylene is preferably 0.1 to 30 mol % in the resulting copolymer.

In the method for producing an olefin polymer particle according to the present invention, when propylene is copolymerized with another α-olefin, typical examples thereof include random copolymerization which involves polymerizing propylene and a small amount of ethylene as comonomers by one stage, or so-called propylene-ethylene block copolymerization which involves homopolymerizing propylene in a first stage (first polymerization vessel) and copolymerizing propylene with another α-olefin such as ethylene in a second stage (second polymerization vessel) or a higher multi-stage (multi-stage polymerization vessel). The block copolymerization of propylene with another α-olefin is preferred.

The block copolymer obtained by the block copolymerization is a polymer comprising continuously varying segments of two or more monomer compositions and refers to a form in which two or more types of polymer chains (segments) differing in polymer primary structure such as monomer species, comonomer species, comonomer composition, comonomer contents, comonomer sequences, or stereoregularity are connected in one molecule.

In the method for producing an olefin polymer particle of the present invention, the polymerization of the olefin may be performed in the presence or absence of an organic solvent.

The olefin to be polymerized can be used in any of gas and liquid states.

The polymerization of the olefin is performed, for example, under heating and increased pressure by introducing the olefin in the presence of the catalyst for olefin polymerization according to the present invention in a reactor such as an autoclave.

In the method for producing an olefin polymer particle of the present invention, the polymerization temperature is usually 200° C. or less, preferably 100° C. or less, and from the viewpoint of improvement in activity or stereoregularity, is more preferably 60 to 100° C., even more preferably 70 to 90° C. and still more preferably 75 to 80° C. In the method for producing a polymer of an olefin according to the present invention, the polymerization pressure is preferably 10 MPa or less, more preferably 6 MPa or less and even more preferably 5 MPa or less.

The details of the olefin polymer particle obtained in the production method according to the present invention are as mentioned in the description of the olefin polymer particle according to the present invention described below.

The present invention can provide a method for producing an olefin polymer particle capable of producing polymer particles with a suppressed content ratio of fine powder and suppressed surface stickiness at high activity.

Next, the polymer particle for olefin polymerization according to the present invention will be described.

The polymer particle for olefin polymerization according to the present invention has a cross-sectional pore area ratio (pore area ratio in the cross section of the olefin polymer particle) of 10 to 50%, in which a ratio $M'X_i/M'X_s$ of a cross-sectional pore area ratio ($M'X_i$) in a region of less than 50% in a radial direction to a cross-sectional pore area ratio ($M'X_s$) in a region of 50% or more in the radial direction from the particle center is 0.50 to 2.00.

The cross-sectional pore area ratio of the polymer particle for olefin polymerization according to the present invention is 10 to 50%, preferably 15 to 50% and more preferably 18 to 50%.

In the polymer particle for olefin polymerization according to the present invention, the ratio of $M'X_i/M'X_s$ of the cross-sectional pore area ratio ($M'X_i$) in the region of less than 50% in the radial direction to the cross-sectional pore area ratio ($M'X_s$) in the region of 50% or more in the radial direction from the particle center is 0.50 to 2.00, preferably 0.80 to 2.00, more preferably 1.00 to 2.00 and even more preferably 1.00 to 1.50.

A method for measuring the ratio $M'X_i/M'X_s$ of the cross-sectional pore area ratio and the average pore area ratio of the olefin polymer particle according to the present invention is the same as the method for measuring the ratio $MX_i/MX_s$ of the cross-sectional pore area ratio and the average pore area ratio of the solid catalyst component for olefin polymerization according to the present invention described above.

In the olefin polymer particle according to the present invention, arithmetic mean values of the cross-sectional pore area ratio, the cross-sectional pore area ratio in the region of 50% or more in the radial direction from the particle center and the cross-sectional pore area ratio in the region of less than 50% in the radial direction, which are determined by the same method as described above after cutting 500 polymer particles using the method described above, are defined as the cross-sectional pore area ratio, the cross-sectional pore area ratio ($M'X_s$) in the region of 50% or more in the radial direction from the particle center and the cross-sectional pore area ratio ($M'X_i$) in the region of less than 50% in the radial direction, respectively.

The olefin polymer particle according to the present invention may be a homopolymer or a copolymer.

The details of an olefin constituting the copolymer and polymerization conditions of the olefin are as mentioned in the description of the olefin polymer particle according to the present invention.

The olefin polymer particle according to the present invention preferably has an average particle size of 100 to 5,000 μm, more preferably 250 to 4,000 μm and even more preferably 300 to 3,000 μm.

In the present application, the average particle size of olefin polymer particles means the average particle size $D_{50}$ 50% (50% particle size in terms of integral particle size in a volume-integrated particle size distribution) when measured using a laser light scattering/diffraction particle size analyzer.

In the olefin polymer particle according to the present invention, the content ratio of the fine powder polymer having a particle size of 45 μm or less is preferably 0.5% by mass or less, more preferably 0.3% by mass or less and even more preferably 0 to 0.1% by mass.

In the olefin polymer particle according to the present invention, the content ratio of fine powder means a value (% by mass) of the content ratio of a polymer having a particle size of less than 45 μm when the volume-based integrated particle size distribution of the polymer is automatically measured with a digital particle size distribution analyzer ("CAMSIZER" manufactured by Horiba Ltd.).

In the olefin polymer particle according to the present invention, the flowability measured by the following method is preferably 5 to 15 g/sec, more preferably 5 to 10 g/sec and even more preferably 5 to 9 g/sec.

<Flowability of Polymer>

An apparatus used is, as shown in FIG. 10, equipped at its upper portion with a funnel F (upper aperture: 91 mm, damper-position aperture: 8 mm, inclination angle: 20°, height up to the damper position: 114 mm) with a damper D disposed at an outlet position, and provided with a container-like receiver C (inside diameter: 40 mm, height: 81 mm) with a space of 38 mm beneath the damper D. First, 50 g of the polymer is added to the funnel F located in an upper portion. Then, the damper D is opened at room temperature (20° C.) so that the polymer falls to the receiver C, and the time for the whole polymer to fall is measured.

From the falling time $T^1$ (sec) of 50 g of the polymer measured by the operation above, the amount of the polymer falling per second (g/sec) is calculated by the following expression and used as an index for the evaluation of polymer flowability.

$$\text{Flowability of polymer particle(amount of polymer falling per second (g/sec))} = 50/T^1$$

The olefin polymer particle according to the present invention can easily exhibit excellent handling, workability or transferability, as the flowability is within the above range and thus the surface stickiness is suppressed.

The olefin polymer particle according to the present invention can be suitably produced by the above-described method for producing olefin polymer particle according to the present invention.

The present invention can provide an olefin polymer particle with a suppressed content ratio of fine powder and suppressed surface stickiness.

EXAMPLES

Next, the present invention will be described further specifically with reference to Examples. However, these examples are given merely for illustration and do not limit the present invention.

Each of the following was determined by forming a thermally conductive coating on the surface of a particle by the following method, then carrying out CCP cross-sectional processing, cross-sectional observation with SEM instrument and EDS measurement: a cross-sectional pore area ratio; $MX_i/MX_s$, which is a ratio of a cross-sectional pore area ratio ($MX_i$) in a region of less than 50% in the radial direction to a cross-sectional pore area ratio ($MX_s$) in a region of 50% or more in the radial direction from a particle center; $M'X_i/M'X_s$, which is a ratio of cross-sectional pore area ratio ($M'X_i$) in a region of less than 50% in the radial direction to a cross-sectional pore area ratio ($M'X_s$) in a region of 50% or more in the radial direction; and $M''X_i/M''X_s$, which is a ratio of a cross-sectional pore area ratio ($M''X_i$) in a region of less than 50% in a radial direction to a cross-sectional pore area ratio ($M''X_s$) in a region of 50% or more in the radial direction.

(Formation of Thermally Conductive Coating)

An ion sputter (JFC-1600, manufactured by JEOL Ltd.) equipped with a gold target for deposition and a rotating stage was placed in a glove box for deposition work that was thoroughly purged with nitrogen. Measurement particles, a spatula, an aluminum shallow container, a silicon wafer (length 5 mm×width 10 mm×thickness 0.2 mm) to which a conductive double-sided tape had been attached in advance and a sealed CCP transfer vessel (for model number IB-19520 CCP, manufactured by JEOL Ltd.) were stored in the glove box, and the inside of the glove box is thoroughly purged with nitrogen.

The aluminum shallow vessel in which about 500 mg of the measurement particles were collected was set in the ion sputter, and gold deposition was performed while rotating the stage at a speed of 30 rpm under conditions of an ultimate vacuum of 15 Pa or less and an applied voltage of 30 mA. Next, the aluminum shallow container containing the measurement particles on which gold was deposited was once taken out from the deposition apparatus, the solid catalyst components in the shallow container were mixed with a spatula, and the container was set in the vacuum deposition apparatus again to perform gold deposition for 5 minutes while rotating the stage at a speed of 30 rpm under conditions of an ultimate vacuum of 15 Pa or less and an applied voltage of 30 mA. This series of operations were repeated three times to form a gold-deposited film on the entire surface of the measurement particles.

<CCP Cross Section Machining>

Then, in the glove box for deposition work that was thoroughly purged with nitrogen, gold-deposited measurement particles were dispersed on the surface of the conductive double-sided tape attached to the silicon wafer in such an amount that the particles did not overlap each other. After the silicon wafer was stored in the sealed CCP transfer vessel, the transfer vessel taken out from the glove box was fixed to a CCP cross-section machining device (manufactured by JEOL Ltd., model number: IB-19520 CCP). Subsequently, while maintaining a vacuum of $10^{-3}$ or less and a CCP stage temperature of −110° C. or less, cross section machining of the solid catalyst components was performed at an acceleration voltage of 3.0 kV for 6 hours by so-called intermittent measurement, in which an argon ion beam was repeatedly turned on for 10 seconds and then turned off for 10 seconds.

<Cross-Sectional Observation with SEM Instrument and EDS Measurement>

JSM-F100 manufactured by JEOL Ltd. was used as the SEM, and a sample that had already been subjected to cross section machining was set together with the transfer vessel removed from the CCP cross-section machining device to observe the cross-section machined portion with a backscattered electron image as illustrated in FIG. 1 at an acceleration voltage of 5 kV.

The SEM image shown in FIG. 1 was processed by using Photoshop software manufactured by Adobe Inc. to create a binarized image after cropping the contour portion of the particle image as shown in FIG. 2.

Then, the same procedure was performed on 500 measurement particles that had already been subjected to cross section machining to determine the cross-sectional pore area ratios (%) of the precursor (B), the solid catalyst component (C) and polymer, $M''X_i/M''X_s$ of the precursor (B), the ratio $MX_i/MX_s$ of the average pore area ratio of the solid catalyst component (C), and the ratio $M'X_i/M'X_s$ of the average pore area ratio of the polymer by the calculation method described above.

Production Example 1

Synthesis of Complex (A) of Titanium Tetrachloride with Internal Electron-Donating Compound To a nitrogen-purged 1,000 mL three-necked flask with a dropping funnel, 200 mL of n-heptane and 0.5 mol of di-n-butyl phthalate were added. Next, 0.5 mol of titanium tetrachloride was added into the dropping funnel while keeping the temperature in the flask at 40° C., and then titanium tetrachloride was added dropwise into the flask.

After completion of the dropwise addition of titanium tetrachloride, the mixture was reacted for 2 hours while keeping the inside of the three-necked flask at 40° C., followed by washing with n-heptane until free titanium components disappeared. Finally, drying was carried out with a vacuum pump until n-heptane disappeared to give a complex (A) of titanium tetrachloride and di-n-butyl phthalate in the form of yellow solid powder.

The titanium content of the resulting complex (A) in the form of a yellow solid powder in the sample was measured in accordance with a method of Japanese Industrial Standard "JIS M 8301", and the titanium tetrachloride content (mol) and di-n-butyl phthalate content (mol) were calculated on the assumption that all the titanium atoms in the sample were titanium tetrachloride. As a result, the molar ratio represented by di-n-butyl phthalate/titanium atoms was 1.09.

Preparation of Precursor (B)

To a nitrogen-purged 100-mL stainless-steel portable reactor (TVS-1 Type, manufactured by Taiatsu Techno Corporation), 30 g of diethoxy magnesium, 5.0 g of the resulting complex (A) in the form of a yellow solid powder, and 50 mL of toluene were added.

The diethoxy magnesium used in Production Example 1 had a bulk density of 0.32 g/mL, an average particle size $D_{50}$ of 38 μm and a particle size distribution index (SPAN) of 0.8 as measured by a method described below. The properties of diethoxy magnesium are shown in Table 1.

Next, the inside of the stainless-steel portable reactor was pressurized with nitrogen to a gauge pressure of 0.9 MPa and maintained at 25° C. for 2 hours. Thereafter, the nitrogen in the stainless-steel portable reactor was brought back to normal pressure (less than 0.01 MPa), and finally washed with n-heptane and dried to give a precursor (B). At that time, when 500 particles were randomly selected from the precursor (B), the cross-sectional pore area ratio was 38%, and the ratio $M''X_i/M''X_s$ of the cross-sectional pore area ratio ($M''X_i$) in the region of less than 50% in the radial direction to the cross-sectional pore area ratio ($M''X_s$) in the region of 50% or more in the radial direction was 1.01. The properties of the precursor (B) are shown in Table 1.

Particle Size Distribution Index (SPAN)

The particle size distribution index (SPAN) of diethoxy magnesium used in each Production Example was calculated by the following expression using the average particle size $D_{50}$ (50% particle size in terms of integral particle size in the volume-integrated particle size distribution) when measured using a laser light scattering/diffraction particle size analyzer, and 90% particle size in terms of the volume-based integrated particle size and 10% particle size in terms of the volume-based integrated particle simultaneously measured at the time of measurement of the size average particle size $D_{50}$.

Particle size distribution index(SPAN)=(90% particle size in terms of volume-based integrated particle size−10% particle size in terms of volume-based integrated particle size)/50% particle size in terms of volume-based integrated particle size(average particle size $D_{50}$)

Example 1

Preparation of Solid Catalyst Component (C)

To a 500 mL round-bottom flask purged with nitrogen gas and equipped with a stirrer and a reflux condenser, 20 g of the precursor (B) obtained in Production Example 1, 160 mL of toluene and 4.8 mL of di-n-butyl phthalate were placed to form a suspension, which was maintained at −5° C.

On the other hand, 20 mL of titanium tetrachloride and 40 mL of toluene were charged into a 500 mL round-bottom flask purged with nitrogen gas and equipped with a stirrer to maintain the formed mixed solution at −4° C. The suspension was added to this mixed solution to form a mixed suspension solution. Thereafter, the mixed suspension solution was warmed and reacted at 105° C. for 2 hours with stirring to give a solid product.

After the completion of the reaction, the resulting solid product was washed three times with 200 ml of toluene at 90° C. Then, 20 ml of titanium tetrachloride and 80 ml of toluene were newly added thereto, and the mixture was warmed to 110° C. and reacted with stirring for 1 hour. Thereafter, the supernatant was removed by decantation, followed by washing 10 times with 120 mL of n-heptane at 40° C., and finally, the residue was dried to give a target solid catalyst component (C). At that time, the cross-sectional pore area ratio of the solid catalyst component (C) particle was 36%, and the ratio $MX_i/MX_s$ of the cross-sectional pore area ratio ($MX_i$) in the region of less than 50% in the radial direction to the cross-sectional pore area ratio ($MX_s$) in the region of 50% or more in the radial direction was 1.01. The properties of the solid catalyst component (C) are shown in Table 2.

<Formation of Olefin Polymerization Catalyst and Propylene Homopolymerization>

Into an autoclave having an internal volume of 2.0 L with a stirrer thoroughly purged with nitrogen gas, 1.32 mmol of triethyl aluminum, 0.13 mmol of cyclohexylmethyldimethoxysilane and 0.0033 mmol of the solid catalyst component obtained in <Preparation of Solid Catalyst Component (C)> on a titanium atom basis were charged to form a catalyst for olefin polymerization.

Thereafter, 1.5 liters of hydrogen gas and 1.0 liters of liquefied propylene were charged, and a polymerization reaction was performed at 70° C. for 1 hour to give a propylene polymer (polymer). The polymerization activity at that time was determined by the following calculation, and the average particle size $D_{50}$ of the resulting propylene polymer and the content ratio of fine powder of 45 μm or less as an index of fine powder content percentage were each measured by a method described below. The results are shown in Table 2.

<Polymerization Activity>

Polymerization activity (g-pp/g-catalyst)=mass (g) of the polymer/mass (g) of the solid catalyst component.

<Average Particle Size $D_{50}$ and Content Ratio of Fine Particle of 45 μm or Less>

The volume-based integrated particle size distribution of the polymer was automatically measured using a digital particle size distribution analyzer ("CAMSIZER" manufactured by Horiba Ltd.) to measure the amount (% by mass) of fine powder having a particle size of less than 45 μm and 50% particle size in terms of a volume-based integrated particle size (average particle size $D_{50}$).

(Measurement Conditions)

Funnel position: 6 mm

Coverage area of camera: basic camera: less than 3, zoom camera: less than 10%

Target coverage area: 0.5%

Width of feeder: 40 mm

Feeder control level: 57 and 40 seconds

Measurement start level: 47

Maximum control level: 80

Control standard: 20

Image rate: 50% (1:2)

Definition of particle size: minimum Martin's diameter measured n times per particle SPHT (sphericity) fitting: 1

Class upper limit: 50 points were selected within a range of 32 to 4,000 μm in a logarithmic scale <Ethylene-Propylene Copolymerization>

Into an autoclave having an internal volume of 2.0 L with a stirrer thoroughly purged with nitrogen gas, 2.4 mmol of triethyl aluminum, 0.24 mmol of diisopropyldimethoxysilane and 6 mg of the solid catalyst component obtained above were charged to prepare an ethylene-propylene copolymerization catalyst.

Into the autoclave with a stirrer containing the ethylene-propylene copolymerization catalyst prepared above, 15 mol (1.2 L) of liquefied propylene and 0.20 MPa (partial pressure) of hydrogen gas were charged, and pre-polymerization was performed at 20° C. for 5 minutes, followed by warming. After the propylene homopolymerization reaction at the first stage (polymerization at a single stage) was performed at 70° C. for 45 minutes, the pressure was brought back to normal pressure. Subsequently, the autoclave (reactor) was purged with nitrogen and was then weighed. Polymerization activity at the single stage (first stage) (g-PP/g-catalyst) was calculated by subtracting the tare mass of the autoclave to separate a portion of the produced polymer for evaluation of polymerization performance and polymer properties (pore volume).

Next, ethylene/propylene was added at a molar ratio of 1.0/1.0 into the autoclave (reactor) and then warmed to 70° C. While ethylene/propylene/hydrogen was introduced thereto such that the respective gas supplies per minute (L/min) were at a ratio of 2/2/0.086, the reaction was performed under conditions of 1.2 MPa, 70° C. and 60 minutes to give an ethylene-propylene copolymer.

The propylene-based block copolymerization activity (ICP (impact copolymer) polymerization activity), the content (wt %) of EPR (ethylene-propylene rubber component) in the resulting propylene-based block copolymer, the flowability of the copolymer particle and the dispersion state of EPR (ethylene-propylene rubber component) inside the polymer particle were each measured for the produced ethylene-propylene copolymer particle by methods given below. The results are shown in Table 3.

<ICP Polymerization Activity>

The propylene-based block copolymerization activity per gram of the solid catalyst component was calculated by the following expression:

$$\text{Propylene-based block copolymerization activity (g-ICP/g-catalyst)} = (I(g)-F(g)+J(g))/[\{\text{mass(g) of solid catalyst component in catalyst for olefin polymerization} \times ((G(g)-F(g)-J(g))\}/(G(g)-F(g)))]$$

where I is the mass (g) of the autoclave after completion of copolymerization; F is the mass (g) of the autoclave; G is the mass (g) of the autoclave after unreacted monomers had been removed after completion of propylene homopolymerization; and J is the amount (g) of polymer extracted after homopolymerization.

<EPR Content (Xylene-soluble Content in Ethylene-propylene Block Copolymer) in Copolymer>

Into a flask equipped with a stirring apparatus, 5.0 g of the copolymer (ICP polypropylene polymer) and 250 ml of xylene were charged, and the outside temperature was set to the boiling point or more (about 150° C.) of xylene, thereby dissolving the polymer over 2 hours while keeping the temperature of p-xylene inside the flask at the boiling point (137 to 138° C.). Then, the liquid temperature was cooled to 23° C. over 1 hour, and an insoluble component and a soluble component were separated by filtration. The solution of the soluble component was collected, and p-xylene was distilled off by heating and drying under reduced pressure. The weight of the resulting residue was determined, and a relative ratio (% by mass) to the formed polymer (propylene-based block copolymer) was calculated to obtain the EPR (ethylene-propylene rubber component) content.

<Flowability of Copolymer Particle>

The flowability of the resulting polymer was measured by a method described below.

An apparatus used was, as shown in FIG. 10, equipped at its upper portion with a funnel F (upper aperture: 91 mm, damper-position aperture: 8 mm, inclination angle: 20°, height up to the damper position: 114 mm) with a damper D disposed at an outlet position, and provided with a container-like receiver C (inside diameter: 40 mm, height: 81 mm)

with a space of 38 mm beneath the damper D. First, 50 g of the polymer was added to the funnel F located in an upper portion. Then, the damper D was opened at room temperature (20° C.) so that the polymer falls to the receiver C, and the time for the whole polymer to fall was measured.

From the falling time $T^1$ (sec) of 50 g of the polymer measured by the operation above, the amount of the polymer falling per second (g/sec) was calculated by the following expression and used as an index for the evaluation of polymer flowability.

$$\text{Polymer flowability (amount of polymer falling per second (g/sec))}=50/T^1$$

<Observation of Inside of Copolymer Particle>

The inside of the formed copolymer particles was observed by the following method to determine the degree of dispersion of the pores:

Using a vacuum electronic staining device (VSC4R1H) manufactured by Filgen, Inc., 200 randomly selected copolymer particles were stained for the EPR components with ruthenium tetroxide at a concentration of 5 for 5 minutes.

Using EpoxiCure 2 manufactured by Buehler Corporation, 80% by weight of a resin agent and 20% by weight of a curing agent were prepared, and the stained copolymer particles and the prepared EpoxiCure 2 were mixed in a 1-inch transparent cup and allowed to stand at room temperature until cured.

The 1-inch cup containing the cured material obtained by the above mixing and curing was cut with an IsoMet cutter manufactured by Buehler Corporation so that the material could be polished, and the resulting cut material was carefully subjected to wet polishing with water using a precision surface polishing machine Handy Lap (HLA-2) manufactured by JEOL Ltd. with polishing paper of #600 (JIS standard) to #5,000 (JIS standard).

Finally, three full-load barrels were loaded on AutoMet 250 manufactured by Buehler Corporation, Mastertex was mounted on a polishing buff. Final finishing was performed with tap water as an extension liquid for 90 seconds in the same direction at a rotational speed of 60 rpm head/150 rpm base, and moisture was blown off with air.

The cross section of the resulting particle was observed with ECLIPSE LV100NDA manufactured by Nikon Corporation.

In the obtained photomicrograph, an EPR-filled portion (pore portion filled with ethylene-propylene rubber) stained with ruthenium tetroxide was observed as a black portion, and a PP site (propylene homopolymer portion) was observed as a white portion. In this example, it was confirmed that almost all the pores observed in the cross section of the copolymer particle were filled with EPR.

In the method for measuring the ratio $M'X_i/M'X_s$ of the cross-sectional pore area ratio and the average pore area ratio of the solid catalyst component for olefin polymerization described above (image analysis method), the cross-sectional pore area ratio ($M'X_s$) in the region of 50% or more in the radial direction from the particle center and the cross-sectional pore area ratio ($M'X_i$) in the region of less than 50% in the radial direction in the cross section of the copolymer particle were each calculated by the same method as described above, except that the cross-sectional image of the copolymer particle was changed to a cross-sectional image of the particle with two gradations (as illustrated in FIG. 4), the PP site was analyzed instead of the texture portion (flat portion), and the EPR-filled portion was analyzed instead of the pore portion (concave portion). The ratio $M'X_i/M'X_s$ of the cross-sectional pore area ratio ($M'X_i$) in the region of less than 50% in the radial direction to the cross-sectional pore area ratio ($M'X_s$) in the region of 50% or more in the radial direction was 1.02. The results are shown in Table 3.

Production Example 2

Preparation of Precursor (B)

The synthesis of complex (A) and the preparation of precursor (B) were carried out in the same manner as in Production Example 1, except that the amount of the complex (A) of titanium tetrachloride and di-n-butyl phthalate added in this process was changed from 5.0 g to 1.0 g.

Example 2

Preparation of a solid catalyst component (C), formation of a polymerization catalyst, and polymerization were carried out in the same manner as in Example 1, except that the solid catalyst component (C) was prepared using the precursor (B) obtained in Production Example 2, and each was evaluated in the same manner as in Example 1. The results are shown in Table 1 to Table 3.

Production Example 3

Preparation of Precursor (B)

The synthesis of complex (A) and the preparation of precursor (B) were carried out in the same manner as in Production Example 1, except that the amount of the complex (A) of titanium tetrachloride and di-n-butyl phthalate added in this process was changed from 5.0 g to 7.0 g.

Example 3

Preparation of a solid catalyst component (C), formation of a polymerization catalyst, and polymerization were carried out in the same manner as in Example 1, except that the solid catalyst component (C) was prepared using the precursor (B) obtained in Production Example 3, and each was evaluated in the same manner as in Example 1. The results are shown in Table 1 to Table 3.

Production Example 4

Preparation of Precursor (B)

The synthesis of complex (A) and the preparation of precursor (B) were carried out in the same manner as in Production Example 1, except that 30 g of diethoxy magnesium having a bulk density of 0.20 g/mL, an average particle size of 15 μm and a particle size distribution index (SPAN) of 1.2 was used in this process.

Example 4

Preparation of a solid catalyst component (C), formation of a polymerization catalyst, and polymerization were carried out in the same manner as in Example 1, except that the solid catalyst component (C) was prepared using the precursor (B) obtained in Production Example 4, and each was evaluated in the same manner as in Example 1. The results are shown in Table 1 to Table 3.

Production Example 5

Preparation of Precursor (B)

The synthesis of complex (A) and the preparation of precursor (B) were carried out in the same manner as in Production Example 1, except that 30 g of diethoxy magnesium having a bulk density of 0.35 g/mL, an average particle size of 102 μm and a particle size distribution index (SPAN) of 1.5 was used in this process.

Example 5

Preparation of a solid catalyst component (C), formation of a polymerization catalyst, and polymerization were carried out in the same manner as in Example 1, except that the solid catalyst component (C) was prepared using the precursor (B) obtained in Production Example 5, and each was evaluated in the same manner as in Example 1. The results are shown in Table 1 to Table 3.

Production Example 6

Preparation of Precursor (B)

The synthesis of complex (A) and the preparation of precursor (B) were carried out in the same manner as in Production Example 1, except that 30 g of diethoxy magnesium having a bulk density of 0.33 g/mL, an average particle size of 74 μm and a particle size distribution index (SPAN) of 1.2 was used in this process.

Example 6

Preparation of a solid catalyst component (C), formation of a polymerization catalyst, and polymerization were carried out in the same manner as in Example 1, except that the solid catalyst component (C) was prepared using the precursor (B) obtained in Production Example 6, and each was evaluated in the same manner as in Example 1. The results are shown in Table 1 to Table 3.

Production Example 7

Preparation of Precursor (B)

The synthesis of complex (A) and the preparation of precursor (B) were carried out in the same manner as in Production Example 1, except that 30 g of diethoxy magnesium having a bulk density of 0.24 g/mL, an average particle size of 19 μm and a particle size distribution index (SPAN) of 0.9 was used in this process.

Example 7

Preparation of a solid catalyst component (C), formation of a polymerization catalyst, and polymerization were carried out in the same manner as in Example 1, except that the solid catalyst component (C) was prepared using the precursor (B) obtained in Production Example 7, and each was evaluated in the same manner as in Example 1. The results are shown in Table 1 to Table 3.

Production Example 8

Preparation of Precursor (B)

The synthesis of complex (A) and the preparation of precursor (B) were carried out in the same manner as in Production Example 1, except that 30 g of diethoxy magnesium having a bulk density of 0.20 g/mL, an average particle size of 9.8 μm and a particle size distribution index (SPAN) of 1.2 was used in this process.

Example 8

Preparation of a solid catalyst component (C), formation of a polymerization catalyst, and polymerization were carried out in the same manner as in Example 1, except that the solid catalyst component (C) was prepared using the precursor (B) obtained in Production Example 8, and each was evaluated in the same manner as in Example 1. The results are shown in Table 1 to Table 3.

Production Example 9

Preparation of Precursor (B)

The synthesis of complex (A) and the preparation of precursor (B) were carried out in the same manner as in Production Example 1, except that 30 g of diethoxy magnesium having a bulk density of 0.37 g/mL, an average particle size of 112 μm and a particle size distribution index (SPAN) of 1.6 was used in this process.

Comparative Example 1

Preparation of a solid catalyst component (C), formation of a polymerization catalyst, and polymerization were carried out in the same manner as in Example 1, except that the solid catalyst component (C) was prepared using the precursor (B) obtained in Production Example 9, and each was evaluated in the same manner as in Example 1. The results are shown in Table 1 to Table 3.

Production Example 10

Preparation of Precursor (B)

The synthesis of complex (A) and the preparation of precursor (B) were carried out in the same manner as in Production Example 1, except that in this process, the inside of the stainless-steel portable reactor was pressurized to a gauge pressure of 0.1 MPa and maintained at 90° C. for 2 hours instead of being pressurized to a gauge pressure of 0.9 MPa and maintained at 25° C. for 2 hours.

Example 9

Preparation of a solid catalyst component (C), formation of a polymerization catalyst, and polymerization were carried out in the same manner as in Example 1, except that the solid catalyst component (C) was prepared using the precursor (B) obtained in Production Example 10, and each was evaluated in the same manner as in Example 1. The results are shown in Table 1 to Table 3.

Production Example 11

Preparation of Precursor (B)

The synthesis of complex (A) and the preparation of precursor (B) were carried out in the same manner as in Production Example 1, except that in this process, the inside of the stainless-steel portable reactor was pressurized to a gauge pressure of 0.9 MPa and maintained at 90° C. for 24 hours instead of being pressurized to a gauge pressure of 0.9 MPa and maintained at 25° C. for 2 hours.

Example 10

Preparation of a solid catalyst component (C), formation of a polymerization catalyst, and polymerization were carried out in the same manner as in Example 1, except that the solid catalyst component (C) was prepared using the precursor (B) obtained in Production Example 11, and each was evaluated in the same manner as in Example 1. The results are shown in Table 1 to Table 3.

Production Example 12

Preparation of Precursor (B)

The synthesis of complex (A) and the preparation of precursor (B) were carried out in the same manner as in Production Example 1, except that 30 g of diethoxy magnesium having a bulk density of 0.20 g/mL, an average particle size of 78 μm and a particle size distribution index (SPAN) of 1.2 was used in this process.

Comparative Example 2

Preparation of a solid catalyst component (C), formation of a polymerization catalyst, and polymerization were carried out in the same manner as in Example 1, except that the solid catalyst component (C) was prepared using the precursor (B) obtained in Production Example 12, and each was evaluated in the same manner as in Example 1.

The results are shown in Table 1 to Table 3.

Comparative Example 3

Using solid catalyst components corresponding to Comparative Examples of the present invention, formation and polymerization of the polymerization catalyst were performed in the same manner as in Example 1, and each was evaluated in the same manner as in Example 1.

A cross-sectional observation photograph of the copolymer particle obtained at this time (before two gradation process) is shown in FIG. 11.

In FIG. 11, it was confirmed that the EPR-filled portion (pore portion filled with ethylene-propylene rubber) stained with ruthenium tetroxide, shown in black, was relatively entirely distributed so as to bite into the central part from the peripheral part of the particle cross section, compared to the PP site (propylene homopolymer parts) shown in white.

TABLE 1

| | Diethoxy Magnesium | | | Precursor (B) | |
|---|---|---|---|---|---|
| | Bulk density (g/mL) | Average particle size D50(μm) | SPAN | Cross-sectional pore area ratio (%) | $M''X_i/M''X_s$ |
| Production Example 1 | 0.32 | 38 | 0.8 | 38 | 1.01 |
| Production Example 2 | 0.32 | 38 | 0.8 | 38 | 1.01 |
| Production Example 3 | 0.32 | 38 | 0.8 | 38 | 1.01 |
| Production Example 4 | 0.20 | 15 | 1.2 | 20 | 1.12 |
| Production Example 5 | 0.35 | 102 | 1.5 | 50 | 1.50 |
| Production Example 6 | 0.33 | 74 | 1.2 | 39 | 1.41 |
| Production Example 7 | 0.24 | 19 | 0.9 | 27 | 1.05 |
| Production Example 8 | 0.20 | 9.8 | 1.2 | 14 | 0.96 |
| Production Example 9 | 0.37 | 112 | 1.6 | 52 | 1.53 |
| Production Example 10 | 0.32 | 38 | 0.8 | 37 | 1.02 |
| Production Example 11 | 0.32 | 38 | 0.8 | 35 | 1.01 |
| Production Example 12 | 0.20 | 78 | 1.2 | 67 | 0.48 |

TABLE 2

| | Solid Catalyst Component (C) | | Polymerization Performance and Polymer Properties | | | | |
|---|---|---|---|---|---|---|---|
| | Cross-sectional pore area ratio (%) | MXi/MXs | Polymerization activity (g-PP/g-catalyst) | Percentage of fine powder component (particle size: 45 um or less) (% by mass) | D50 (μm) | Cross-sectional pore area ratio (%) | M'Xi/M'Xs |
| Example 1 | 36 | 1.01 | 52,500 | 0.0 | 1,150 | 32 | 1.01 |
| Example 2 | 36 | 1.01 | 52,900 | 0.0 | 1,120 | 31 | 1.01 |
| Example 3 | 36 | 1.01 | 53,300 | 0.0 | 1,190 | 31 | 1.01 |
| Example 4 | 20 | 1.11 | 55,200 | 0.0 | 390 | 22 | 1.12 |
| Example 5 | 50 | 1.50 | 51,500 | 0.0 | 3,160 | 49 | 1.48 |
| Example 6 | 39 | 1.39 | 52,500 | 0.0 | 2,340 | 39 | 1.39 |
| Example 7 | 27 | 1.04 | 54,300 | 0.0 | 610 | 26 | 1.07 |
| Example 8 | 14 | 0.96 | 56,500 | 0.3 | 310 | 13 | 0.94 |
| Comparative Example 1 | 55 | 1.54 | 52,800 | 0.6 | 3,400 | 54 | 1.51 |
| Example 9 | 36 | 1.02 | 51,500 | 0.0 | 1,150 | 35 | 1.02 |
| Example 10 | 35 | 1.01 | 50,200 | 0.0 | 1,020 | 33 | 1.04 |
| Comparative Example 2 | 67 | 0.48 | 42,100 | 5.7 | 2,240 | 65 | 0.49 |

TABLE 3

| | Polymerization activity at single stage (g-PP/ g-catalyst) | Copolymerization activity (g-ICP/g-catalyst) | EPR content (wt %) | Flowability (g/sec) | M'Xi/ M'Xs |
|---|---|---|---|---|---|
| Example 1 | 52,500 | 12,800 | 21.5 | 6.9 | 1.02 |
| Example 2 | 52,900 | 11,100 | 20.4 | 7.2 | 1.03 |
| Example 3 | 53,300 | 11,900 | 20.6 | 7.0 | 1.02 |
| Example 4 | 55,200 | 9,500 | 19.7 | 8.4 | 1.15 |
| Example 5 | 51,500 | 14,200 | 22.2 | 8.1 | 1.45 |
| Example 6 | 52,500 | 10,700 | 20.7 | 6.2 | 1.42 |
| Example 7 | 54,300 | 9,200 | 18.9 | 9.0 | 1.05 |
| Example 8 | 56,500 | 10,600 | 20.1 | 9.2 | 0.98 |
| Comparative Example 1 | 52,800 | 15,200 | 23.1 | 9.6 | 1.54 |
| Example 9 | 51,500 | 9,800 | 19.8 | 6.7 | 1.03 |
| Example 10 | 50,200 | 10,200 | 21.7 | 6.8 | 1.06 |
| Comparative Example 2 | 42,100 | 7,800 | 21.3 | 13.1 | 0.49 |

As can be seen from Tables 2 and 3, in Examples 1 to 10, the solid catalyst components constituting the catalyst for olefin polymerization have a cross-sectional pore area ratio of 10 to 50%, in which the ratio $MX_i/MX_s$ of the cross-sectional pore area ratio ($MX_s$) in the region of less than 50% in the radial direction to the cross-sectional pore area ratio ($MX_s$) in the region of 50% or more in the radial direction from the particle center is 0.50 to 2.00, thus indicating that a polymer with a suppressed content ratio of fine powder can be produced at high activity.

The possible reason for this is that the solid catalyst components have a specific cross-sectional pore area ratio and $MX_i/MX_s$ to form catalyst particles with high strength, a structure that is not easily broken during polymerization and a low content ratio of fine powder particles.

In addition, it is found that by using the solid catalyst components, a polymer having $M'X_i/M'X_s$ corresponding to $MX_i/MX_s$ of each solid catalyst component can be produced (see Tables 2 and 3), and the resulting copolymer particles have low flowability and can suppress surface stickiness (see Table 3).

The possible reason for this is that copolymer particles having a specific pore distribution can be produced by using a solid catalyst component having a specific cross-sectional pore area ratio and $MX_i/MX_s$ as the solid catalyst component, and the presence of EPR (ethylene-propylene rubber) exclusively in the pores in the peripheral portion of the copolymer microporous skeleton structure formed by PP (propylene homopolymer) can suppress surface adhesion and exudation of the rubber component, thereby suppressing stickiness.

For this reason, it is found that in Examples 1 to 10, polymer particles with a reduced content ratio of fine powder, low flowability and suppressed stickiness on the surface of polymer particles can be produced at high activity when subjected to polymerization of an olefin.

In contrast, as can be seen from Tables 2 and 3, in Comparative Examples 1 and 2, the solid catalyst components constituting the catalyst for olefin polymerization have a cross-sectional pore area ratio outside the range of 10 to 50%, in which the ratio $MX_i/MX_s$ of the cross-sectional pore area ratio (MX) in the region of less than 50% in the radial direction to the cross-sectional pore area ratio ($MX_s$) in the region of 50% or more in the radial direction from the particle center is outside the range of 0.50 to 2.00, thus indicating that the resulting polymer particles have a high content ratio of fine powder (Table 2), high flowability and high stickiness on the surface of the polymer particles (Table 3).

INDUSTRIAL APPLICABILITY

The present invention can provide a solid catalyst component for olefin polymerization capable of suitably producing polymer particles with a suppressed content ratio of fine powder and reduced surface stickiness at high activity when subjected to polymerization of an olefin, and can also provide a method for producing a solid catalyst component for olefin polymerization, a catalyst for olefin polymerization, a method for producing an olefin polymer particle, and an olefin polymer particle.

The invention claimed is:

1. A solid catalyst component for olefin polymerization, comprising magnesium, titanium, halogen and an internal electron-donating compound, wherein a cross-sectional pore area ratio is 10 to 50%, and a ratio $MX_i/MX_s$ of a cross-sectional pore area ratio ($MX_i$) in a region of less than 50% in a radial direction to a cross-sectional pore area ratio ($MX_s$) in a region of 50% or more in the radial direction from a particle center is 0.50 to 2.00.

2. A method for producing a solid catalyst component for olefin polymerization, comprising contacting a magnesium compound, a tetravalent titanium halogen compound and an internal electron-donating compound with each other, followed by pressurization to prepare a precursor, and further contacting the precursor, a tetravalent titanium halogen compound and an internal electron-donating compound with each other;

wherein the solid catalyst component comprises magnesium, titanium, halogen and the internal electron-donating compound, wherein a cross-sectional pore area ratio is 10 to 50%, and a ratio $MX_i/MX_s$ of a cross-sectional pore area ratio ($MX_i$) in a region of less than 50% in a radial direction to a cross-sectional pore area ratio ($MX_s$) in a region of 50% or more in the radial direction from a particle center is 0.50 to 2.00.

3. A catalyst for olefin polymerization, comprising:

(A) the solid catalyst component for olefin polymerization according to claim 1, and (B) an organoaluminum compound.

4. The catalyst for olefin polymerization according to claim 3, further comprising (C) an external electron-donating compound.

5. A method for producing an olefin polymer particle, comprising polymerizing an olefin using the catalyst for olefin polymerization according to claim 3.

6. An olefin polymer particle, wherein a cross-sectional pore area ratio is 10 to 50%, and a ratio $M'X_i/M'X_s$ of a cross-sectional pore area ratio ($M'X_i$) in a region of less than 50% in a radial direction to a cross-sectional pore area ratio ($M'X_s$) in a region of 50% or more in the radial direction from a particle center is 0.50 to 2.00.

* * * * *